(12) United States Patent
Miura

(10) Patent No.: US 10,681,245 B2
(45) Date of Patent: Jun. 9, 2020

(54) INFORMATION PROCESSING APPARATUS

(71) Applicant: KYOCERA DOCUMENT SOLUTIONS INC., Osaka (JP)

(72) Inventor: Tomohiro Miura, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/524,364

(22) Filed: Jul. 29, 2019

(65) Prior Publication Data

US 2019/0349499 A1 Nov. 14, 2019

Related U.S. Application Data

(62) Division of application No. 15/438,331, filed on Feb. 21, 2017, now Pat. No. 10,425,556.

(30) Foreign Application Priority Data

Mar. 1, 2016 (JP) .................. 2016-038682
Mar. 1, 2016 (JP) .................. 2016-038683
Mar. 1, 2016 (JP) .................. 2016-038684

(51) Int. Cl.
*H04N 1/387* (2006.01)
*H04N 1/00* (2006.01)
(Continued)

(52) U.S. Cl.
CPC ......... *H04N 1/393* (2013.01); *H04N 1/00331* (2013.01); *H04N 1/38* (2013.01);
(Continued)

(58) Field of Classification Search
CPC combination set(s) only.
See application file for complete search history.

(56) References Cited

U.S. PATENT DOCUMENTS

2005/0201796 A1\* 9/2005 Arkin .................. B41J 3/4075
400/76
2006/0289625 A1\* 12/2006 Tamune .................. G09B 1/00
235/375
(Continued)

FOREIGN PATENT DOCUMENTS

JP 1999-328309 A 11/1999
JP 2007-004523 A 1/2007
(Continued)

OTHER PUBLICATIONS

Japan Patent Office, Office action dated Feb. 5, 2019.

*Primary Examiner* — Helen Zong
(74) *Attorney, Agent, or Firm* — Li & Cai Intellectual Property (USA) Office

(57) ABSTRACT

Provided is an information processing apparatus including: a marking extraction circuit that extracts, from a script image including a plurality of markings respectively superimposed on a plurality of character strings, the plurality of markings; a same-character-string identification circuit that identifies the same character string out of the plurality of character strings on which the markings are respectively superimposed; and a symbol determination circuit that allocates the same symbol to the same character string and allocates different symbols to different character strings.

6 Claims, 18 Drawing Sheets

(51) Int. Cl.
*H04N 1/417* (2006.01)
*H04N 1/393* (2006.01)
*H04N 1/38* (2006.01)

(52) U.S. Cl.
CPC ......... *H04N 1/3876* (2013.01); *H04N 1/4177* (2013.01); *H04N 2201/0094* (2013.01); *H04N 2201/3243* (2013.01)

(56) References Cited

U.S. PATENT DOCUMENTS

2017/0060836 A1* 3/2017 Cook ...................... G06F 17/28
2019/0108201 A1* 4/2019 Abrahami ............. G06F 17/212

FOREIGN PATENT DOCUMENTS

| | | |
|---|---|---|
| JP | 2009017041 A | 1/2009 |
| JP | 2010-101970 A | 5/2010 |
| JP | 2013073310 A | 4/2013 |

* cited by examiner

Script image (S101) → Blank images (S109) → Synthesis image (S110)

ABC DEF GHI JKL MNO
PQR STU VWX YZ.
ABC DEF GHI JKL MNO
PQR STU VWX.
ABC DEF GHI JKL MNO
PQR STU VWX 123.

ABC (1) GHI JKL MNO
PQR STU VWX (2).
ABC (1) GHI JKL MNO
PQR STU VWX.
ABC (1) GHI JKL MNO
PQR STU VWX (3).

FIG.4

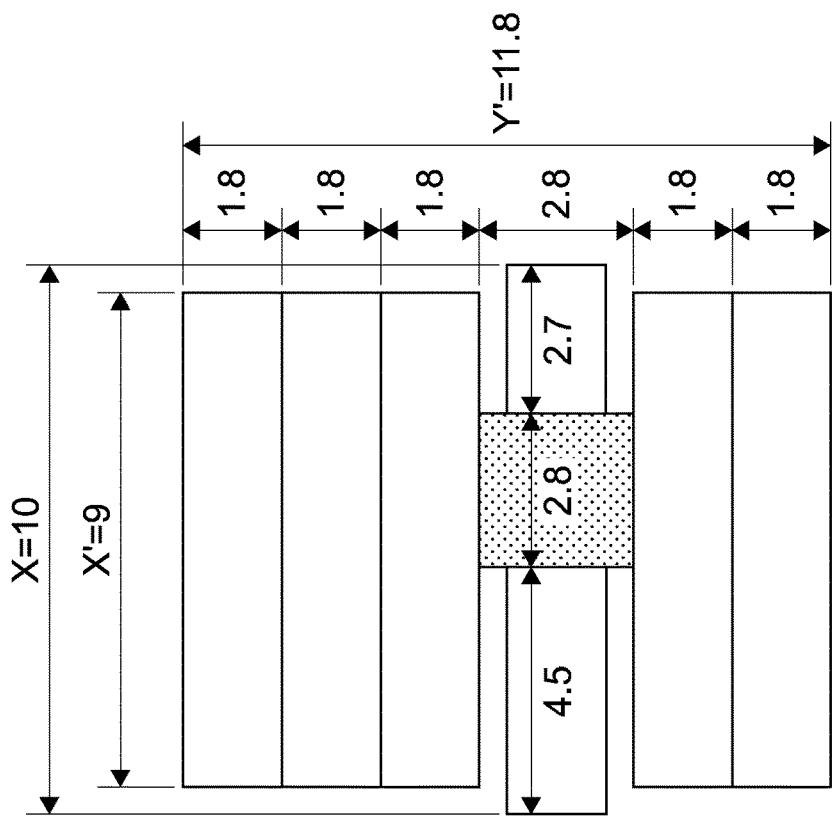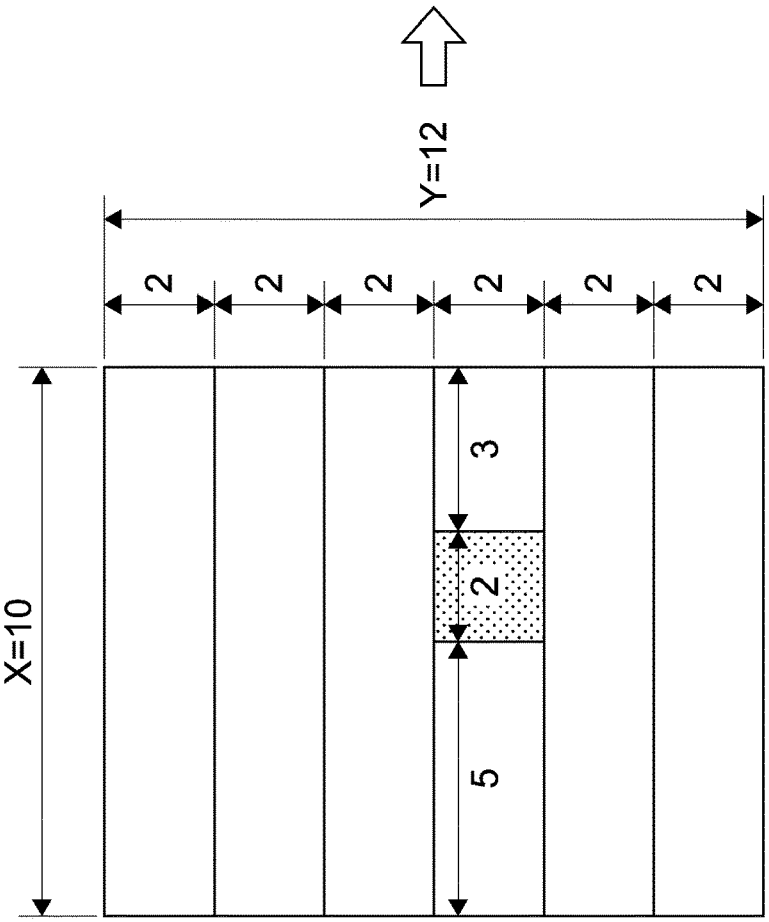
FIG.13

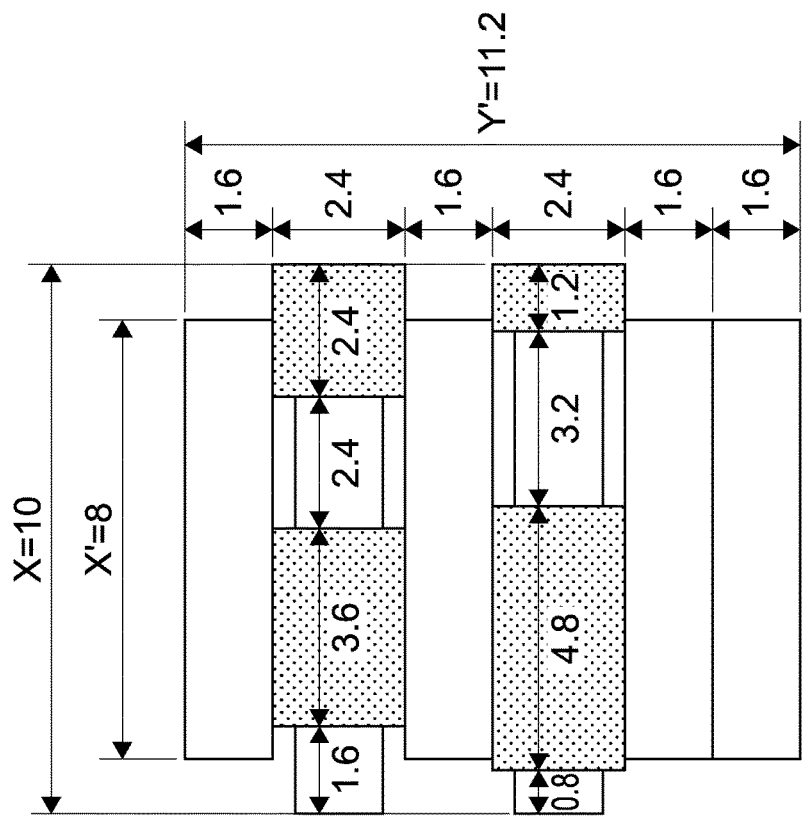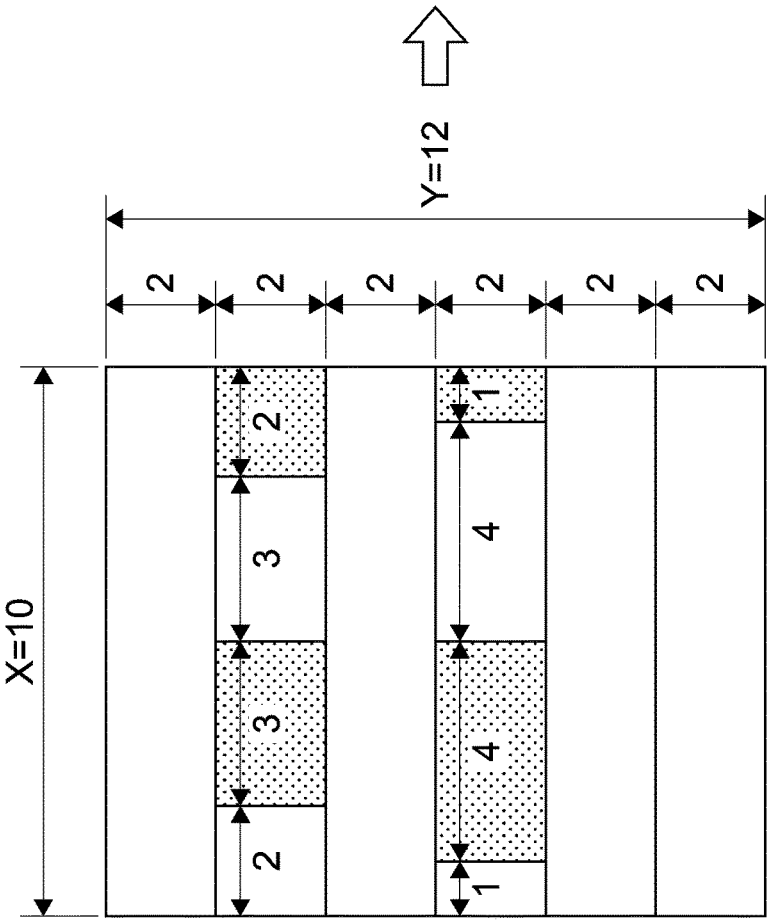
FIG.14

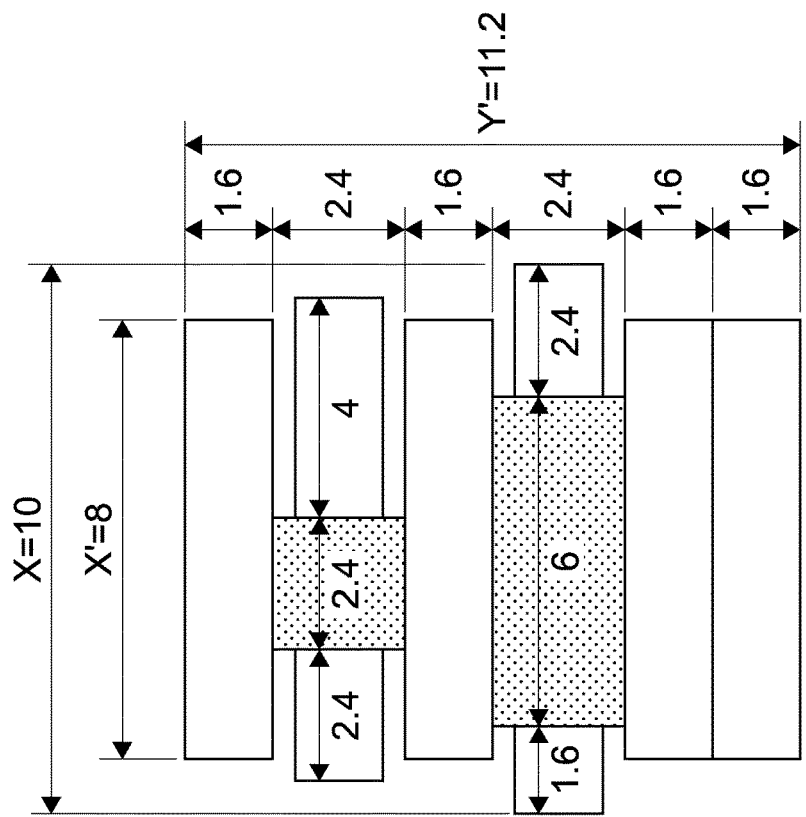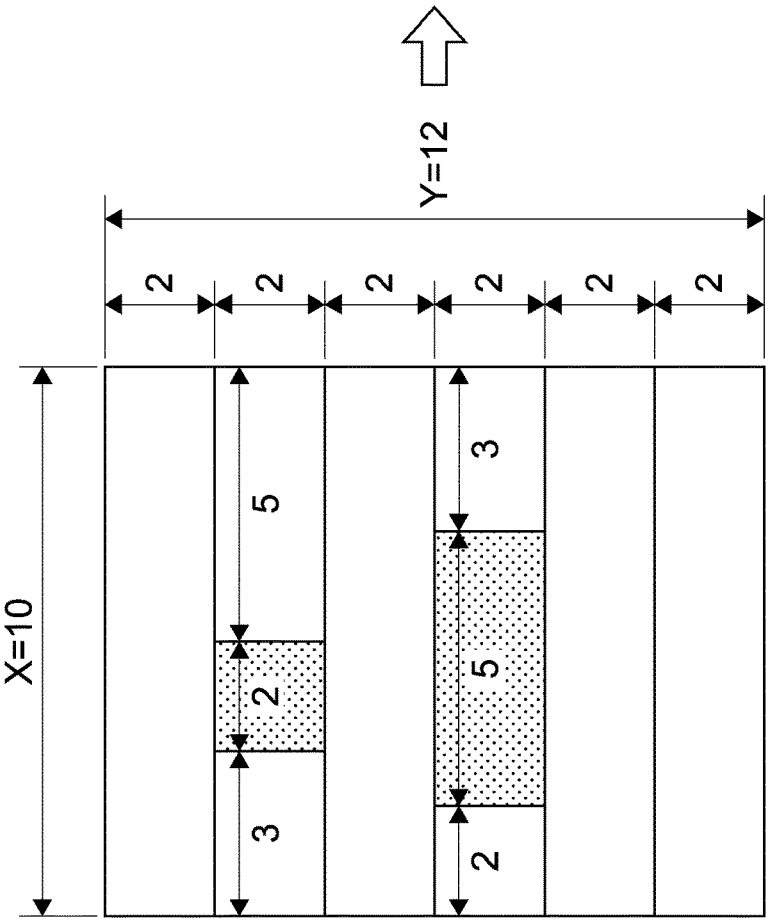
FIG.15

INFORMATION PROCESSING APPARATUS

CROSS REFERENCE TO RELATED APPLICATION

This application claims the benefit of Japanese Priority Patent Applications JP2016-038682, JP2016-038683, and JP2016-038684 filed Mar. 1, 2016, the entire contents of which are incorporated herein by reference.

BACKGROUND OF THE INVENTION

1. Field of the Invention

The present disclosure relates to an information processing apparatus capable of creating, from a script image including a plurality of markings superimposed on a plurality of character strings, fill-in-the-blank questions that require marked character strings as answers to the questions.

2. Description of Related Art

There is known a technology of creating a fill-in-the-blank question by reading a script image in which a character string that is to be an answer to a question is designated by a handwritten marking, extracting a marking image from image data of the read script, extracting the character string at the marking position, deleting the character string at the marking position, and setting a blank at a portion from which the character string has been deleted. Optical character recognition (OCR) is known as the technology of extracting character strings.

SUMMARY OF THE INVENTION

An information processing apparatus according to an embodiment of the present disclosure includes: a marking extraction circuit that extracts, from a script image including a plurality of markings respectively superimposed on a plurality of character strings, the plurality of markings; a same-character-string identification circuit that identifies the same character string out of the plurality of character strings on which the markings are respectively superimposed; and a symbol determination circuit that allocates the same symbol to the same character string and allocates different symbols to different character strings.

An information processing apparatus according to an embodiment of the present disclosure includes: a marking extraction circuit that extracts, from a script image including a character string area including a character string on which a marking is superimposed and a character string on which a marking is not superimposed, the marking; and an image conversion circuit that creates an enlarged character string by enlarging the character string on which the marking is superimposed and creates a reduced character string by reducing the character string on which a marking is not superimposed.

An information processing apparatus according to an embodiment of the present disclosure includes: a marking extraction circuit that extracts, from a script image including a marking superimposed on a character string, the marking; and a character string comparison circuit that extracts, from the script image, a character string on which a marking is not superimposed, the character string being the same as that on which a marking is superimposed.

These and other objects, features and advantages of the present disclosure will become more apparent in light of the following detailed description of best mode embodiments thereof, as illustrated in the accompanying drawings.

BRIEF DESCRIPTION OF THE DRAWINGS

FIG. 4 illustrates operations of the image forming apparatus;

FIG. 13 illustrates a method of calculating an enlargement ratio or reduction ratio in Example 3;

FIG. 14 illustrates a method of calculating an enlargement ratio or reduction ratio in Example 4;

FIG. 15 illustrates a method of calculating an enlargement ratio or reduction ratio in Example 5;

DETAILED DESCRIPTION OF THE PREFERRED EMBODIMENTS

Hereinafter, embodiments of the present disclosure will be described with reference to the drawings.

I. First Embodiment (1. Hardware Configuration of Image Forming Apparatus)

Figure 1:
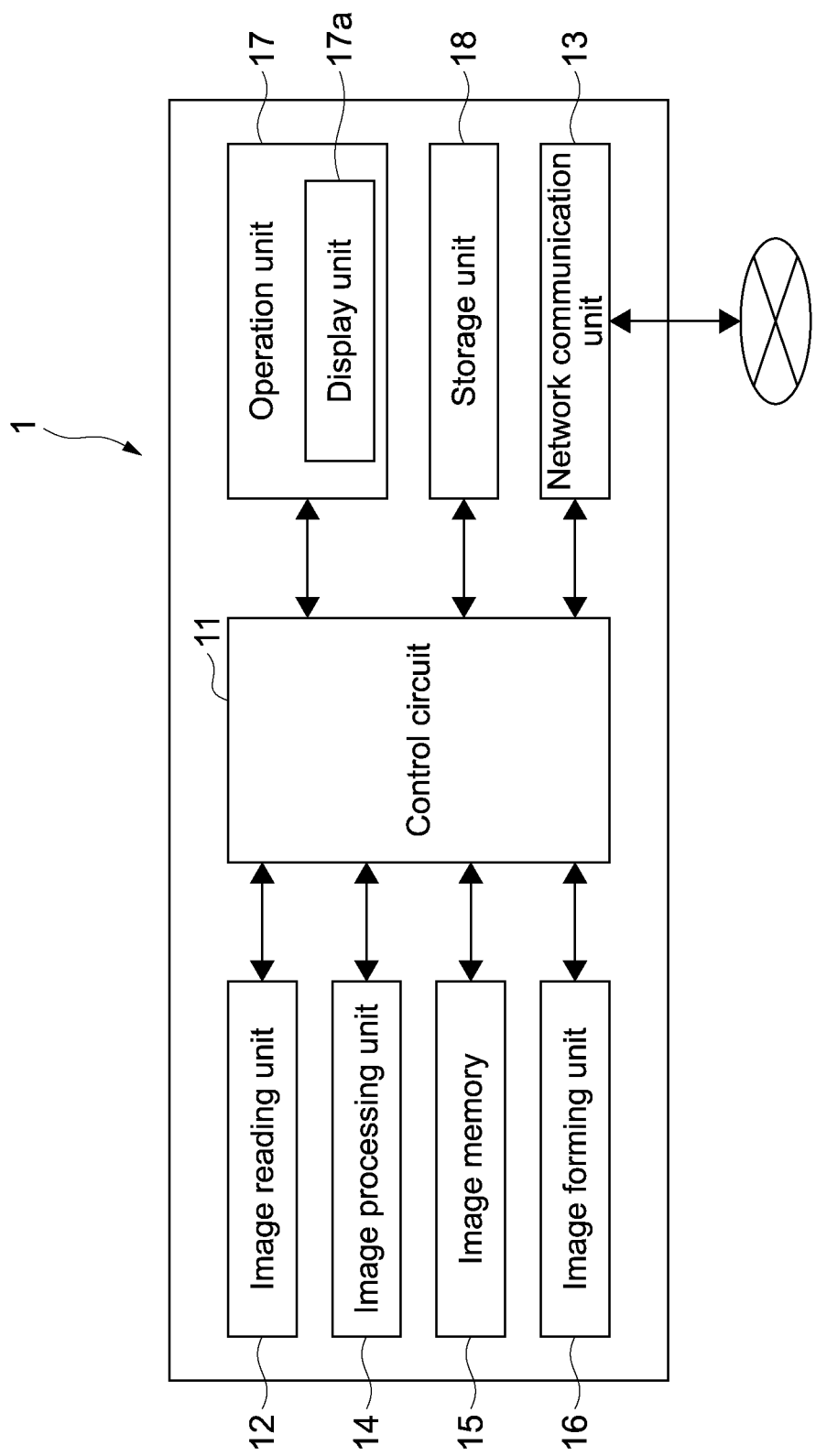
FIG. 1 shows a hardware configuration of an image forming apparatus according to a first embodiment.

FIG. 1 shows a hardware configuration of an image forming apparatus according to a first embodiment of the present disclosure.

Information processing apparatuses according to the embodiments of the present disclosure are each an image forming apparatus (e.g., MFP; Multifunction Peripheral) and will hereinafter be referred to as MFP.

An MFP 1 includes a control circuit 11. The control circuit 11 is constituted of a CPU (Central Processing Unit), a RAM (Random Access Memory), a ROM (Read Only Memory), a dedicated hardware circuit, and the like and collectively controls operations of the MFP 1. A computer program that causes the MFP 1 to function as the respective functional units (described later) is recorded in a non-transitory recording medium such as a ROM.

The control circuit 11 is connected to an image reading unit 12, an image processing unit 14, an image memory 15, an image forming unit 16, an operation unit 17, a storage unit 18, a network communication unit 13, and the like. The control circuit 11 controls operations of the respective units connected thereto and exchanges signals and data with those units.

The control circuit 11 controls drive and processing of mechanisms requisite for executing operational control of functions including a scanner function, a printing function, and a copy function according to job execution instructions input by a user via the operation unit 17, a personal computer (not shown) connected to a network, or the like.

The image reading unit 12 reads an image from a script.

The image processing unit 14 processes image data of the image read by the image reading unit 12 as necessary. For example, the image processing unit 14 carries out image processing such as shading correction for improving image quality obtained after the image read by the image reading unit 12 is formed.

The image memory 15 includes an area for temporarily storing data of a script image read by the image reading unit 12 or temporarily storing data to be printed by the image forming unit 16.

The image forming unit 16 performs image formation of image data read by the image reading unit 12 and the like.

The operation unit 17 includes a touch panel unit and an operation key unit for receiving user instructions on various operations and processing executable by the MFP 1. The touch panel unit includes a display unit 17a such as an LCD (Liquid Crystal Panel) provided with a touch panel.

The network communication unit 13 is an interface for connecting to the network.

The storage unit 18 is a large-capacity storage apparatus such as an HDD (Hard Disk Drive) that stores a script image read by the image reading unit 12 and the like.

(2. Functional Configuration of Image Forming Apparatus)

Figure 2:
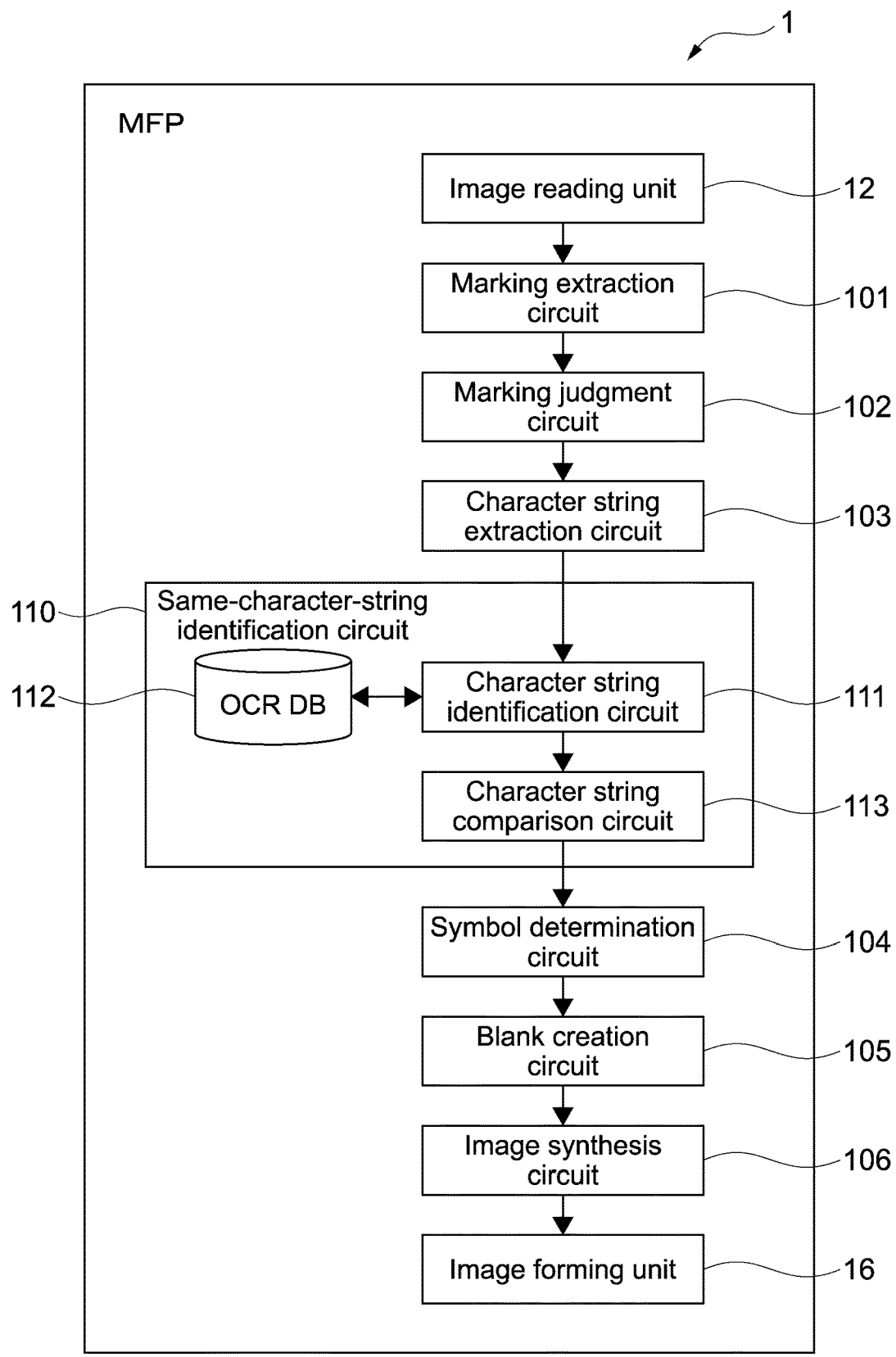
FIG. 2 shows a functional configuration of the image forming apparatus.

FIG. 2 shows a functional configuration of the image forming apparatus.

By loading an information processing program stored in the ROM as an example of a non-transitory computer-readable recording medium in the RAM and executing it, the MFP 1 functions as a marking extraction circuit 101, a marking judgment circuit 102, a character string extraction circuit 103, a same-character-string identification circuit 110, a symbol determination circuit 104, a blank creation circuit 105, and an image synthesis circuit 106.

The marking extraction circuit 101 extracts a plurality of markings respectively superimposed on a plurality of character strings from a script image read by the image reading unit 12.

The marking judgment circuit 102 determines a position and shape of each of the plurality of markings extracted by the marking extraction circuit 101, within the script image.

Based on the position and shape of each of the plurality of markings judged by the marking judgment circuit 102, the character string extraction circuit 103 extracts the plurality of character strings on which the markings are respectively superimposed.

The same-character-string identification circuit 110 includes a character string identification circuit 111, an OCR database 112, and a character string comparison circuit 113 and identifies the same character string out of the plurality of character strings on which the markings are superimposed.

The symbol determination circuit 104 allocates the same symbol to the same character string identified by the character string comparison circuit 113 and allocates different symbols to different character strings.

The blank creation circuit 105 creates a blank image to be superimposed on each of the plurality of character strings on which the markings are superimposed.

The image synthesis circuit 106 creates a synthesis image by synthesizing the script image read by the image reading unit 12, the blank image created by the blank creation circuit 105, and a symbol image as an image of a symbol allocated by the symbol determination circuit 104.

(3. Operations of Image Forming Apparatus)

Figure 3:
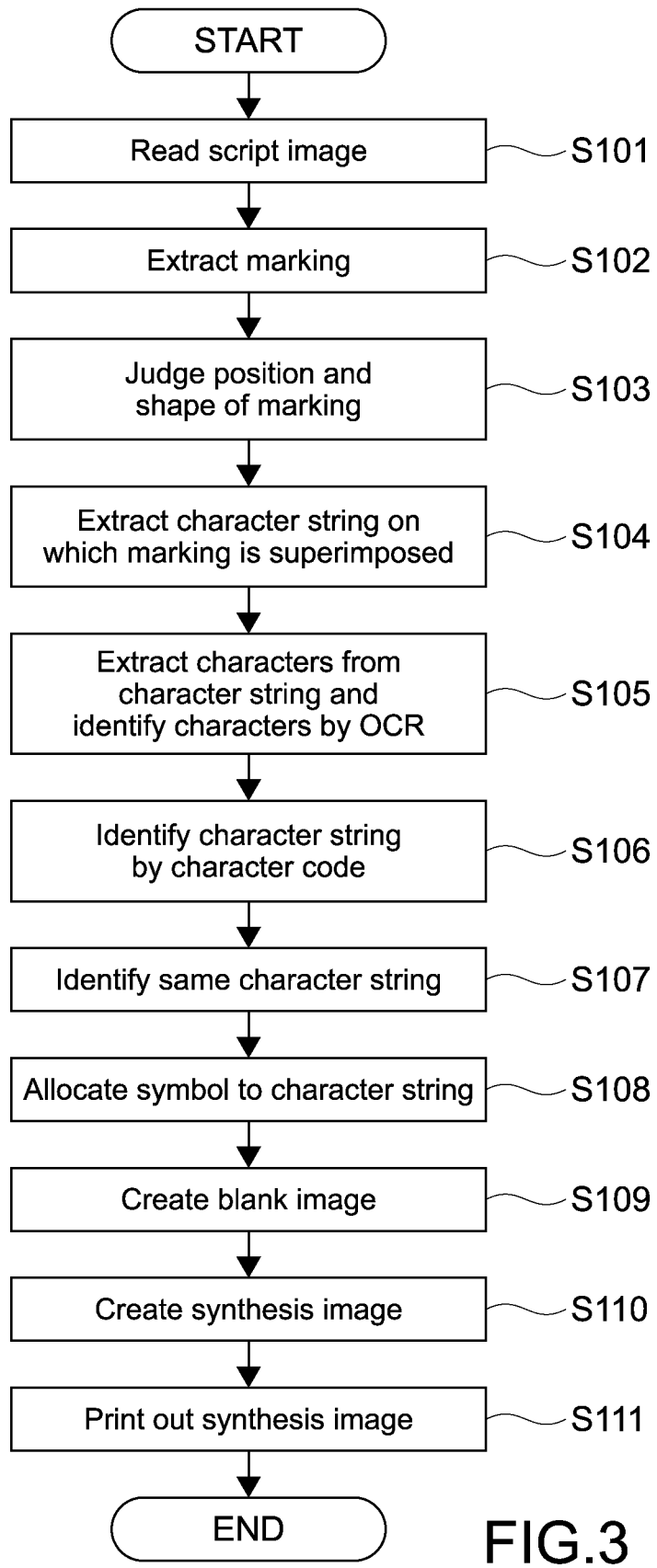
FIG. 3 shows an operational flow of the image forming apparatus.

FIG. 3 shows an operational flow of the image forming apparatus. FIG. 4 illustrates operations of the image forming apparatus.

As a presupposition, character strings as text data are printed on a script (typically, paper). Alternatively, an image of character strings as image data is formed on a script (script on which character strings are printed is copied). In addition, a plurality of character strings (idiom, paragraph, numerical value, etc.) as a part of the entire character strings are marked in handwriting by the user as a question creator using a fluorescent marker or the like. The marked character strings are character strings that are to be answers for fill-in-the-blank questions.

The image reading unit 12 optically scans a script and reads a script image (Step S101, see FIG. 4). The "script image" is image data of a document script including a large number of character strings as a whole and includes a plurality of markings superimposed on a plurality of character strings (hatched portions in FIG. 4). The "character string" is a phrase (word, paragraph, sentence, etc.), a numerical value, or the like and is, to be exact, an image thereof.

The marking extraction circuit 101 extracts, from the script image read by the image reading unit 12, a plurality of markings respectively superimposed on a plurality of character strings (Step S102). Specifically, the marking extraction circuit 101 extracts, as a marking, an area that has a specific shape and size (strip-like rectangle having specific width, etc.) and whose brightness and/or chroma differ(s) from those/that of the background (white etc.).

The marking judgment circuit 102 judges a position and shape of each of the plurality of markings extracted by the marking extraction circuit 101, within the script image (Step S103). Specifically, the marking judgment circuit 102 calculates the position and shape of each of the markings as coordinates with reference to the entire script image as a coordinate system.

Based on the position and shape (coordinates) of each of the plurality of markings judged by the marking judgment circuit 102, the character string extraction circuit 103 extracts the plurality of character strings on which the plurality of markings are respectively superimposed (Step S104). Specifically, the character string extraction circuit 103 extracts, by edge detection, character strings on which markings, that are defined by the positions and shapes (coordinates) judged by the marking judgment circuit 102, are superimposed. It should be noted that the character string extraction circuit 103 extracts an entire character string on which one marking is superimposed as one character string instead of extracting characters included in a character string one by one.

The character string identification circuit 111 identifies each of the plurality of character strings extracted by the character string extraction circuit 103. Specifically, the character string identification circuit 111 extracts a plurality of characters from each of the plurality of character strings extracted by the character string extraction circuit 103. The "characters" are each a single character included in a character string (may be single word depending on language) and are, to be exact, an image thereof. The character string identification circuit 111 references the OCR database 112 and identifies each of the plurality of extracted characters (Step S105). Specifically, in the OCR database 112, a character image pattern and a character code are associated with each other and registered for each character. The character string identification circuit 111 searches the OCR database 112 for an image pattern indicating the extracted character and acquires a character code associated with the image pattern obtained by the search. The character string identification circuit 111 acquires a character code for all the characters included in a character string. The character string identification circuit 111 identifies each of the character strings by combining the character codes of all the characters included in the character strings (Step S106). The character string identification circuit 111 extracts characters from all the character strings on which markings are superimposed, acquires character codes respectively indicating the characters, combines the character codes, and uses the combined character codes to identify the character strings.

The character string comparison circuit 113 compares the character strings identified by the character string identification circuit 111 to identify the same character string (Step S107). Specifically, the character string comparison circuit 113 identifies the same character string by comparing the combined character codes for all the character strings on which markings are superimposed.

The symbol determination circuit 104 allocates the same symbol (number, character, mark, etc.) to the same character string identified by the character string comparison circuit 113 and allocates different symbols to different character strings (Step S108).

The blank creation circuit 105 creates a blank image to be superimposed on each of the plurality of character strings on which markings are superimposed (Step S109, see FIG. 4). Specifically, the blank creation circuit 105 creates a blank image having a shape and position (coordinates) with which the character string extracted by the character string extraction circuit 103 using edge detection (Step S104) and edge portions of the marking sticking out from the character string are hidden by the blank image. The blank image may be a simple blank or may include a specific style (underline, rectangular frame, parenthesis, etc.). In the example shown in FIG. 4, blank images include underlines.

The image synthesis circuit 106 creates a synthesis image by synthesizing the script image read by the image reading unit 12 (Step S101), the blank images created by the blank creation circuit 105 (Step S109), and symbol images as images of symbols allocated by the symbol determination circuit 104 (Step S108) (Step S110, see FIG. 4). Specifically, the image synthesis circuit 106 arranges the blank images whose shapes and positions are defined by coordinates, in the coordinate system of the script image. Then, the image synthesis circuit 106 arranges symbols of a specific style (font, size, etc.) at a specific position (center, left end, etc.) of the blank images arranged in the script image to create a synthesis image. In the example shown in FIG. 4, the script image, the blank images including underlines, and the symbol images are synthesized.

The image forming unit 16 forms (prints out) the synthesis image created by the image synthesis circuit 106 on a paper (Step S111).

II. Second Embodiment

In descriptions below, descriptions on configurations, operations, and the like that are similar to those of the first embodiment will be omitted, and different points will mainly be described.

In the first embodiment, the same-character-string identification circuit 110 identifies character strings by optical character recognition (OCR) (Step S105) (Step S106) and identifies the same character string (Step S107). In contrast, in a second embodiment, the same-character-string identification circuit identifies the same character string by a method different from the optical character recognition (OCR).

(1. Functional Configuration of Image Forming Apparatus)

Figure 5:
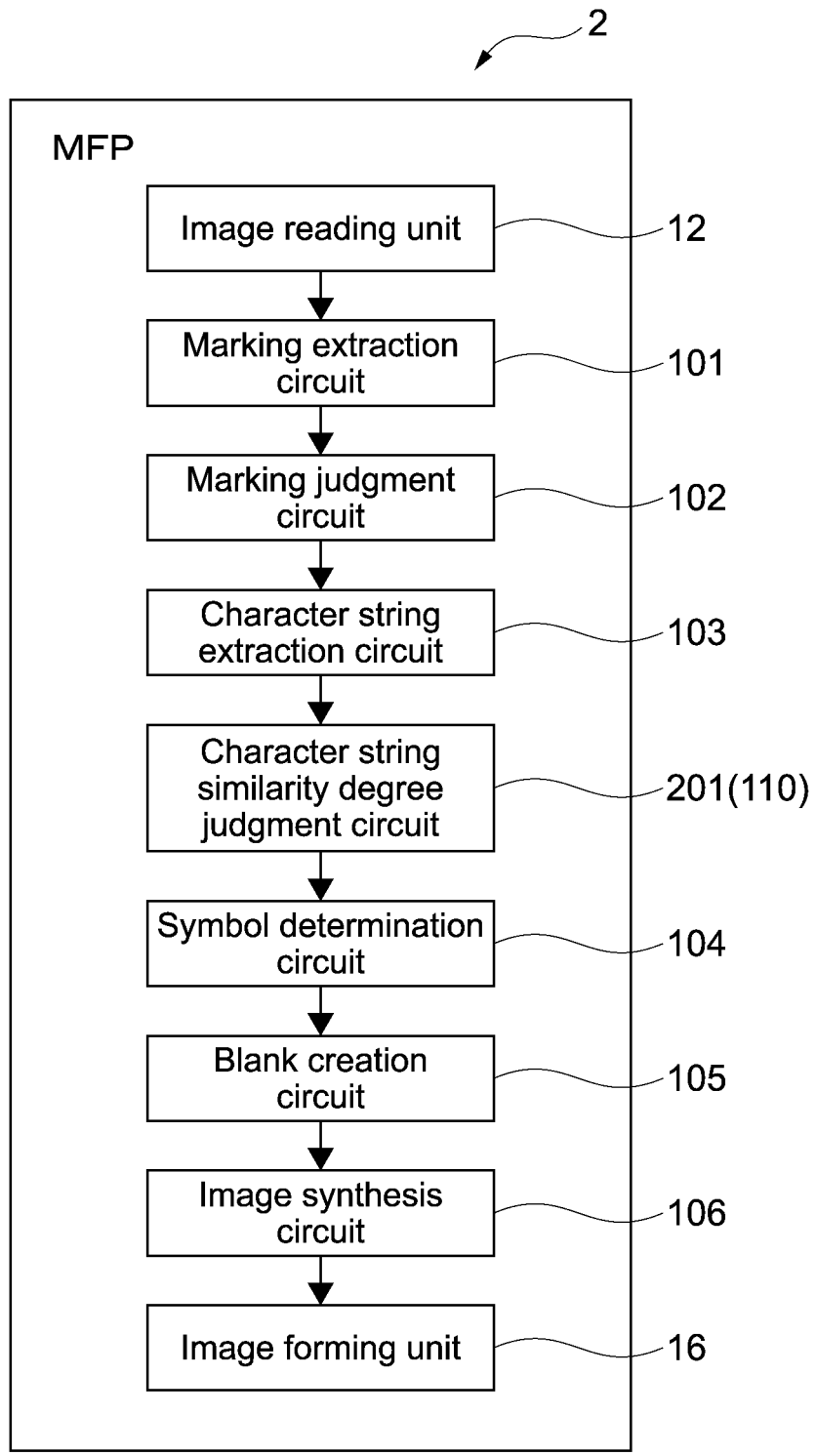
FIG. 5 shows a functional configuration of an image forming apparatus according to a second embodiment.

FIG. 5 shows a functional configuration of an image forming apparatus according to the second embodiment.

By loading an information processing program stored in a ROM as an example of a non-transitory computer-readable recording medium in a RAM and executing it, an MFP 2 functions as the marking extraction circuit 101, the marking judgment circuit 102, the character string extraction circuit 103, a character string similarity degree judgment circuit 201, the symbol determination circuit 104, the blank creation circuit 105, and the image synthesis circuit 106. The MFP 2 includes the character string similarity degree judgment circuit 201 in place of the same-character-string identification circuit 110 according to the first embodiment including the character string identification circuit 111, the OCR database 112, and the character string comparison circuit 113. Other configurations are similar to those of the MFP 1 according to the first embodiment.

The character string similarity degree judgment circuit 201 judges a similarity degree among the plurality of character strings extracted by the character string extraction circuit 103 and judges that the plurality of character strings are the same character string when the similarity degree is equal to or larger than a threshold value.

(2. Operations of Image Forming Apparatus)

Figure 6:
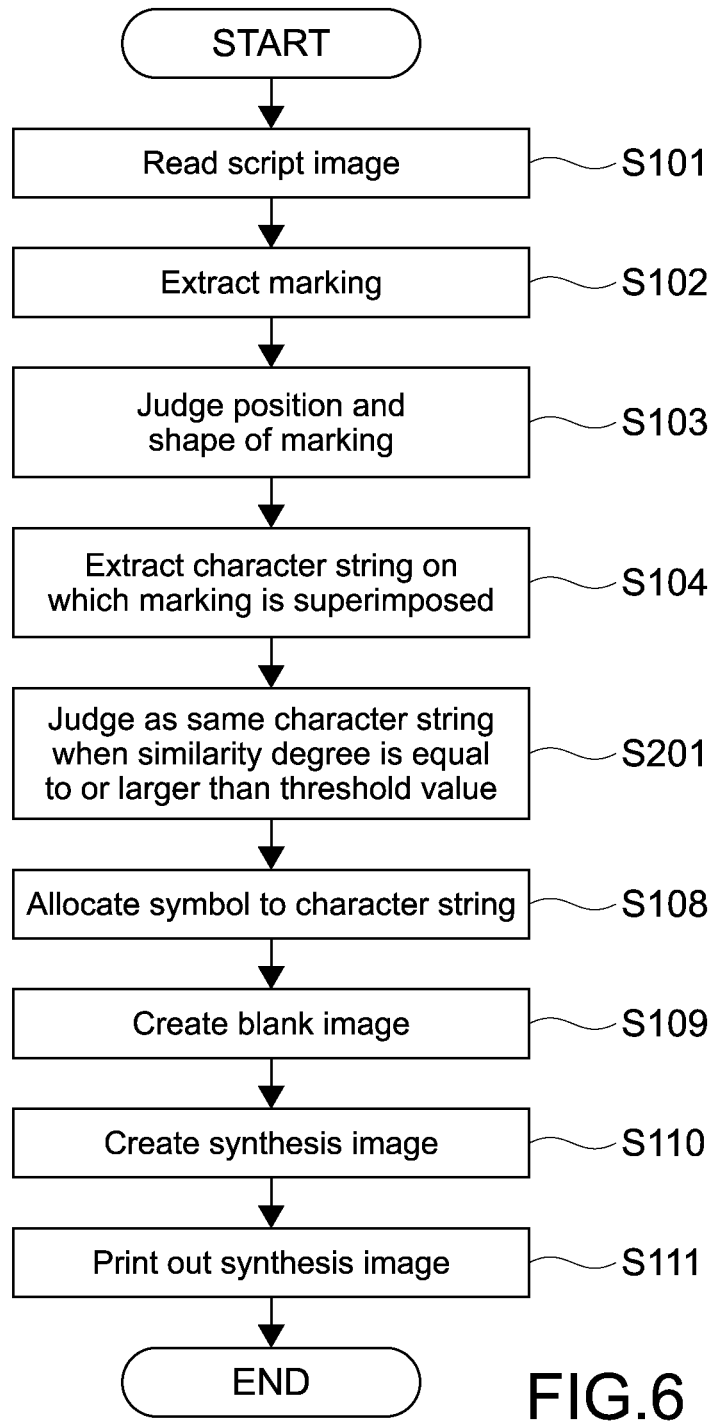
FIG. 6 shows an operational flow of the image forming apparatus.

FIG. 6 shows an operational flow of the image forming apparatus.

Steps S101 to S104 are similar to those of the first embodiment.

After Step S104, the character string similarity degree judgment circuit 201 judges a similarity degree among the plurality of character strings extracted by the character string extraction circuit 103 (Step S104) and judges that the plurality of character strings are the same character string when the similarity degree is equal to or larger than a threshold value (Step S201). Specifically, the character string similarity degree judgment circuit 201 compares image patterns (pixels) of the character strings and judges that the character strings are the same character string when an overlapping degree of the image patterns is equal to or larger than a threshold value. The threshold value should be a value with which the character strings can be judged as the same character string even when character configurations are the same but fonts differ. For example, the threshold value is 90% or the like, but a user may be allowed to arbitrarily set the threshold value as an identification level.

Steps S108 to S111 after Step S201 are similar to those of the first embodiment.

(3. Modified Example)

In the embodiments above, the image reading unit 12 reads a script image (Step S101). Alternatively, the MFP 1 or 2 may receive a script image from an information processing apparatus (not shown) connected to a network via the network communication unit 13.

(4. Conclusion)

When creating fill-in-the-blank questions using an original script, the same character string which is an answer may frequently appear in a set of sentences. In this case, because the character strings as an answer may serve as a hint when displayed as they are in the set of sentences, all the same character strings as an answer need to be replaced with blanks. In other words, there are a plurality of blanks for the same character string as an answer. However, when different symbols are allocated to a plurality of blanks for the same character string as an answer, an answerer may misunderstand that different words are required as answers in those blanks. The question creator manually allocating the same symbol to the plurality of blanks for the same character string as an answer for preventing such a situation from occurring requires time and effort. Particularly when there are a large number of blanks in total, when there are a plurality of sets of the same character string, and the like, the manual allocation of symbols by the question creator will lead to allocation of different symbols by mistake.

In contrast, according to the embodiments above, the MFP 1 allocates the same symbol to the same character string and allocates different symbols to different character strings (Step S108). Accordingly, a situation where the answerer misunderstands that different words are required as answers due to different symbols being allocated to the plurality of blanks for the same character string as an answer is prevented from occurring. Moreover, time and effort required for the question creator to manually allocate the same symbol to the plurality of blanks for the same character string as an answer is eliminated, and different symbols will not be allocated by mistake.

In the second embodiment, the MFP 2 judges a similarity degree among the plurality of character strings and determines that the plurality of character strings are the same character string when the similarity degree is equal to or larger than the threshold value (Step S201). In other words, it is only necessary to determine that the character strings are the same irrespective of actual characters included in the character strings. In the second embodiment, there are advantages that a processing amount is smaller than that of the first embodiment that uses OCR and that database is unnecessary.

It should be noted that although the embodiments above describe the processing carried out when character strings each including a plurality of characters are marked, when a single character is marked as a character string, the processing can be carried out according to FIGS. 3 and 6. In this case, in Step S106 of FIG. 3, the character string identification circuit 111 does not need to combine character codes of all the characters included in the character string and only needs to identify the character by the character code of the single character on which a making is superimposed. In addition, in Step S107 of FIG. 3, the character string identification circuit 111 only needs to identify the same single character by comparing the character codes for all the single characters on which markings are respectively superimposed.

III. Third Embodiment (1. General Outline)

In a third embodiment, a character string on which a marking is not superimposed is reduced in size to create a reduced character string, and a character string on which a marking superimposed is enlarged to create an enlarged character string. Consequently, the size of character string on which a blank image is to be superimposed is relatively increased.

(2. Functional Configuration of Image Forming Apparatus)

Figure 7:
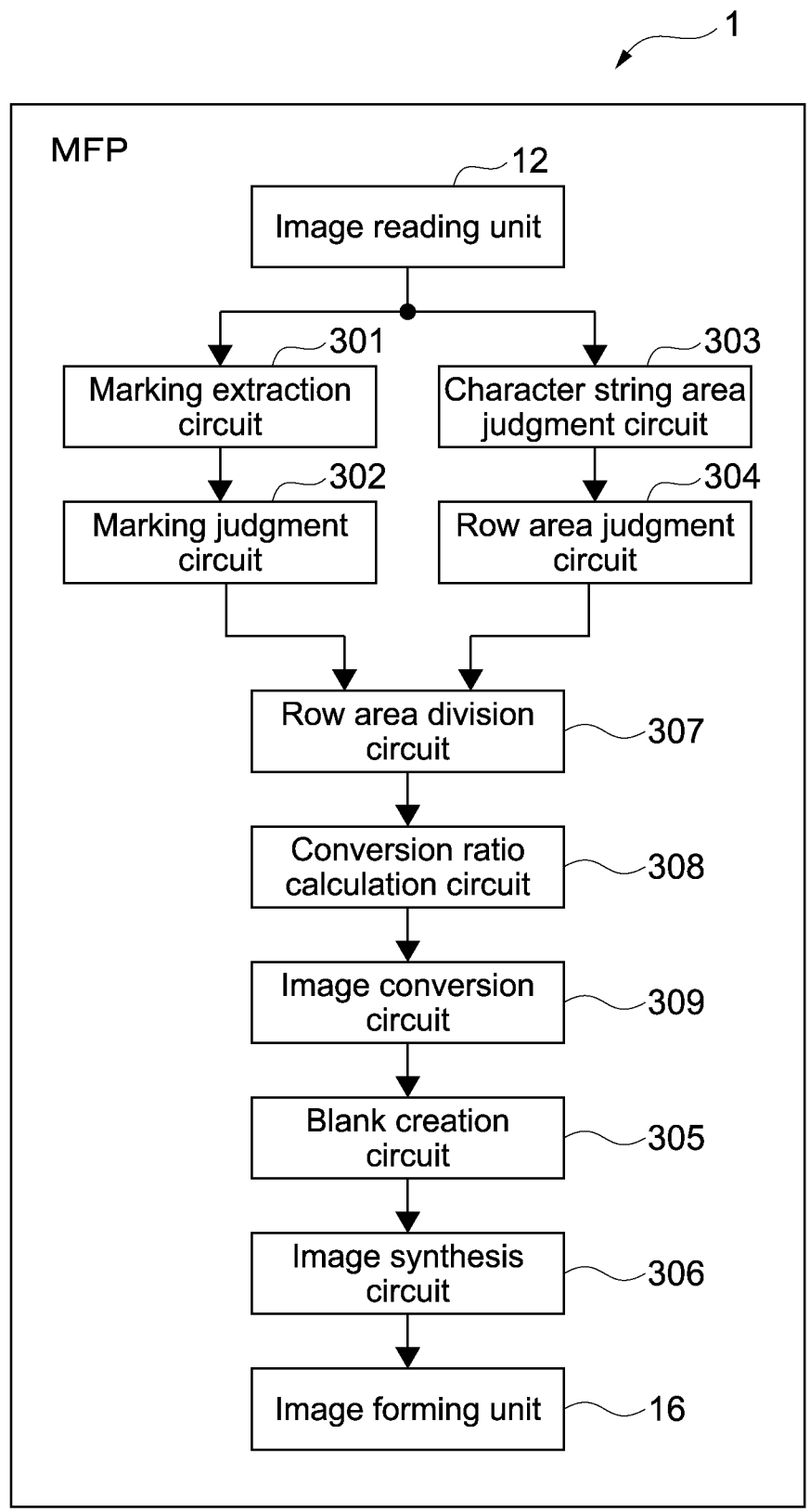
FIG. 7 shows a functional configuration of an image forming apparatus according to a third embodiment.

FIG. 7 shows a functional configuration of an image forming apparatus according to the third embodiment.

By loading an information processing program recorded in the ROM as an example of a non-transitory computer-readable recording medium in the RAM and executing it, the MFP 1 functions as a marking extraction circuit 301, a marking judgment circuit 302, a character string area judgment circuit 303, a row area judgment circuit 304, a row area division circuit 307, a conversion ratio calculation circuit 308, an image conversion circuit 309, a blank creation circuit 305, and an image synthesis circuit 306.

The marking extraction circuit 301 extracts a marking superimposed on a character string from a script image read by the image reading unit 12.

The marking judgment circuit 302 judges a position and size of the marking extracted by the marking extraction circuit 301, within the script image.

The character string area judgment circuit 303 judges a position and size of a character string area within the script image.

The row area judgment circuit 304 divides the character string area judged by the character string area judgment circuit 303 into a plurality of row areas. The row area judgment circuit 304 judges a position and size of each of the plurality of row areas within the character string area.

The row area division circuit 307 judges a position and size of the marking extracted by the marking extraction circuit 301, within the row area to which the marking belongs. The row area division circuit 307 divides the row area to which the marking belongs into a marking superimposed on a character string and a character string on which a marking is not superimposed. It should be noted that the "character string" in this embodiment refers to a unit constituted of one character or a unit constituted of a plurality of consecutive characters.

The conversion ratio calculation circuit 308 calculates an enlargement ratio for enlarging the character string on which the marking is superimposed or a reduction ratio for reducing the character string on which a marking is not superimposed.

The image conversion circuit 309 enlarges the character string on which the marking is superimposed to create an enlarged character string. The image conversion circuit 309 reduces the character string on which a marking is not superimposed in size to create a reduced character string. The image conversion circuit 309 lays out the created enlarged character string and reduced character string in a script to be output.

The blank creation circuit 305 creates a blank image to be superimposed on the enlarged character string created by the image conversion circuit 309.

The image synthesis circuit 306 creates a synthesis image by laying out an image of the reduced character string created by the image conversion circuit 309 and the blank image created by the blank creation circuit 305.

(3. Operations of Image Forming Apparatus)

Figure 8:
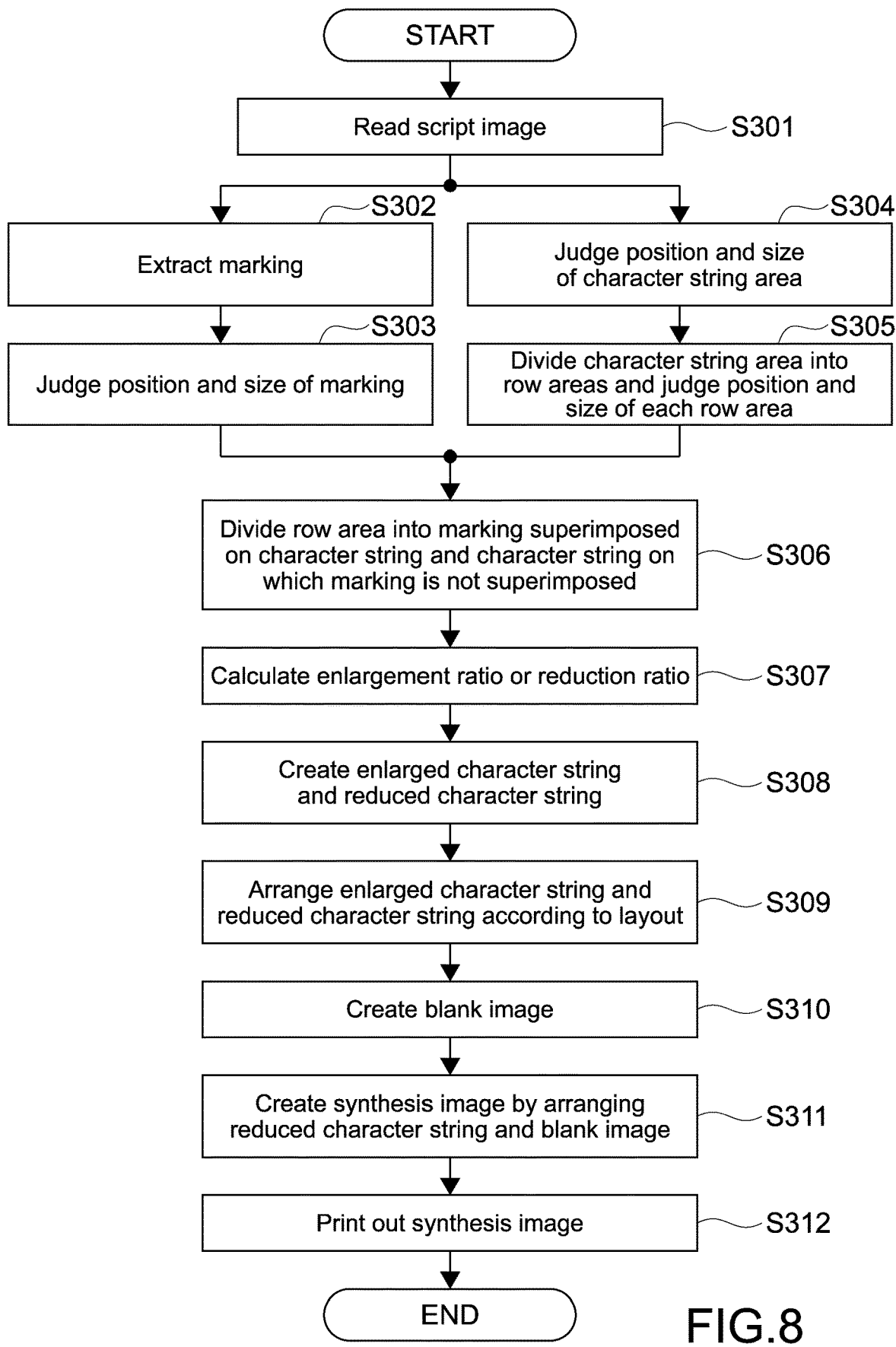
FIG. 8 shows an operational flow of the image forming apparatus.
Figure 9:
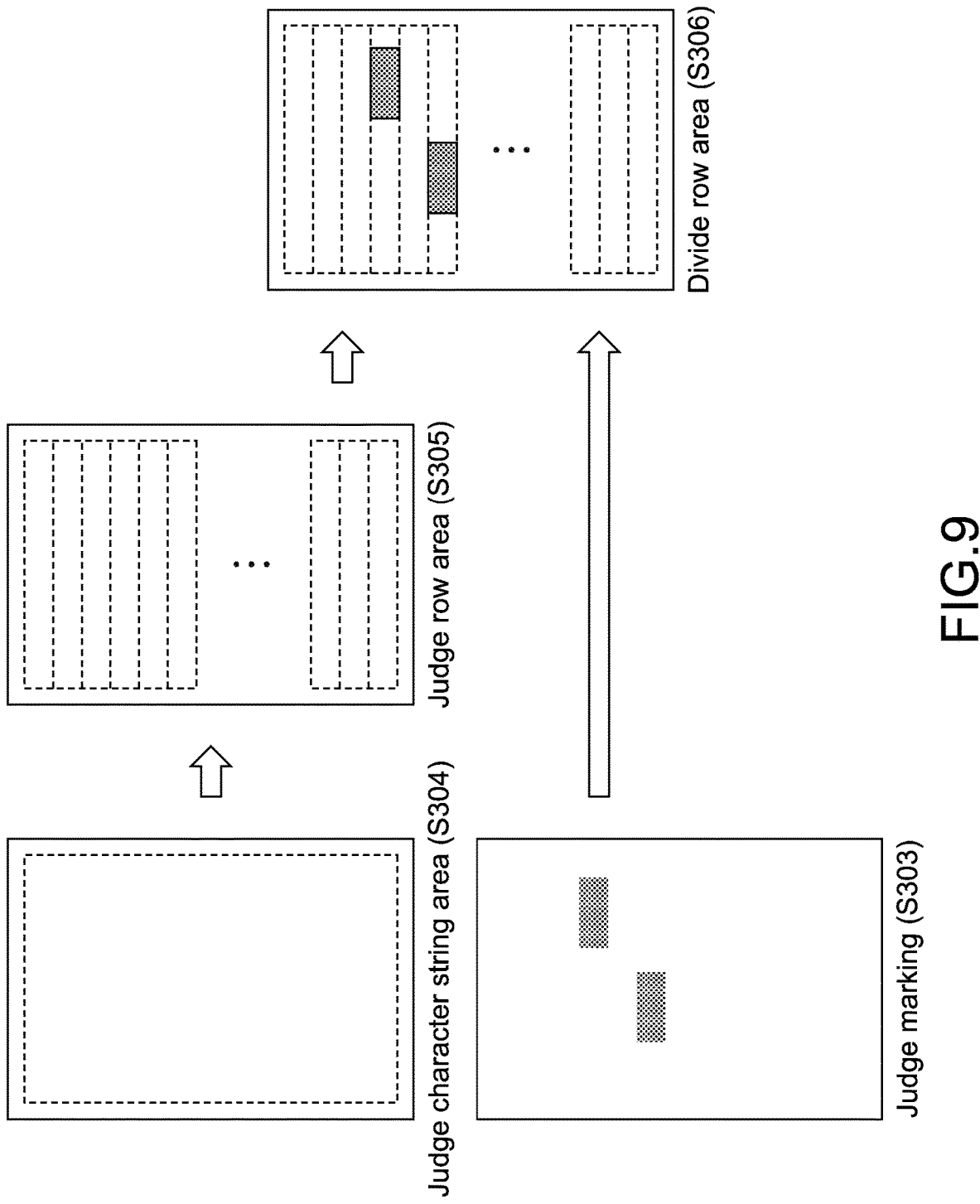
FIG. 9 illustrates operations of the image forming apparatus.

FIG. 8 shows an operational flow of the image forming apparatus. FIG. 9 illustrates operations of the image forming apparatus.

As a presupposition, character strings as text data are printed on a script (typically, paper). Alternatively, an image of character strings as image data is formed on a script (script on which character strings are printed is copied). In addition, a plurality of character strings (idiom, paragraph, numerical value, etc.) as a part of the entire character strings are marked in handwriting by the user as a question creator using a fluorescent marker or the like. The marked character strings are character strings that are to be answers for fill-in-the-blank questions.

The image reading unit 12 optically scans a script and reads a script image (Step S301). The "script image" is image data of a document script including a large number of character strings as a whole and includes a plurality of markings superimposed on a plurality of character strings. The "character string" is a phrase (word, paragraph, sentence, etc.), a numerical value, or the like and is, to be exact, an image thereof.

The marking extraction circuit 301 extracts, from the script image read by the image reading unit 12, a marking superimposed on a character string (Step S302). Specifically, the marking extraction circuit 301 extracts, as a marking, an area that has a specific shape and size (strip-like rectangle having specific width, etc.) and whose brightness and/or chroma differ(s) from those/that of the background (white etc.).

The marking judgment circuit 302 judges a position and shape of each marking extracted by the marking extraction circuit 301 (each hatched portion shown in lower left diagram of FIG. 9), within the script image (Step S303, see FIG. 9). Specifically, the marking judgment circuit 302 calculates the position and size of the marking as coordinates with reference to the entire script image (including margin) as a coordinate system.

Meanwhile, in parallel with Steps S302 and S303, the character string area judgment circuit 303 judges a position and size of the character string area within the script image (Step S304, see FIG. 9). The "character string area" is an area where an aggregate of character strings including a character string/character strings on which a marking/markings is/are superimposed and a character string/character strings on which a marking is not superimposed exists in a script image. Specifically, the character string area judgment circuit 303 calculates the position and size of the character string area with reference to the entire script image (including margin) as a coordinate system.

The row area judgment circuit 304 divides the character string area judged by the character string area judgment circuit 303 into a plurality of row areas. The "row areas" are each an area obtained by dividing the aggregate of character strings present in the character string area by each row. In other words, in a document script, a plurality of characters are generally arranged consecutively in one direction to form one row. The "row area" means an area including a consecutive character string in one row, from one end to the other end of the character string area. Moreover, the "row area" including a character string of one row and the "row area" including the character string of the next row are adjacent to each other. In other words, there is no space between the two adjacent row areas. In the example shown in the center diagram of FIG. 9, the rectangular row areas surrounded by broken lines are consecutively arranged without a space. The row area judgment circuit 304 judges the position and size of each of the plurality of row areas obtained by dividing the character string area, within the character string area (Step S305, see FIG. 9). Specifically, the row area judgment circuit 304 calculates the position and size of the row areas within the character string area with reference to the entire script image as a coordinate system.

The row area division circuit 307 judges a position and size of the marking extracted by the marking extraction circuit 301 (Step S302), within the row area to which the marking belongs. Specifically, the row area division circuit 307 acquires the position and size of the marking in the script image, that have been judged by the marking judgment circuit 302 (Step S303), and the position and size of each of the plurality of row areas in the character string area, that have been judged by the row area judgment circuit 304 (Step S305). The row area division circuit 307 converts the position and size of the marking in the script image into the position and size of the marking in the plurality of row areas in the character string area, to thereby judge the position and size of the marking within the row area to which the marking belongs. In the example shown in the diagram on the right-hand side of FIG. 9, the positions and sizes of markings (hatched portions) of a fourth row area from the top and a sixth row area from the top, within each row area, are judged. Then, the row area division circuit 307 divides the row area to which the marking belongs into a marking superimposed on a character string and character strings on which a marking is not superimposed (Step S306, see FIG. 9). Specifically, the row area division circuit 307 calculates the position and size of the marking as coordinates and calculates the position and size of each character string on which a marking is not superimposed as coordinates.

The conversion ratio calculation circuit 308 calculates an enlargement ratio for enlarging the character string on which the marking is superimposed, the marking being obtained by the division by the row area division circuit 307 (Step S306), or a reduction ratio for reducing the character string on which a marking is not superimposed (Step S307). Based on specific one of the enlargement ratio and reduction ratio, the conversion ratio calculation circuit 308 calculates the other one of the enlargement ratio and reduction ratio. Examples of the case where an enlargement ratio is specified include a case where a user presets an enlargement ratio in the MFP 1 using the operation unit 17 and a case where the user presets a blank size in the MFP 1 using the operation unit 17 (enlargement ratio is specified based on original character size and blank size). Examples of the case where a reduction ratio is specified include a case where a user presets a reduction ratio in the MFP 1 using the operation unit 17 and a case where the user presets a reduced character size in the MFP 1 using the operation unit 17 (reduction ratio is specified based on original (before reduction) character size and reduced character size).

For example, the conversion ratio calculation circuit 308 calculates the enlargement ratio or reduction ratio such that a length of the row area including the enlarged character string in a direction in which characters are arranged within the row area is equal to or smaller than the length of the row area obtained before the enlargement or reduction in the same direction. More specifically, the conversion ratio calculation circuit 308 calculates the enlargement ratio or reduction ratio such that the enlarged character string or reduced character string has a maximum size within a range where a length of the row area including the enlarged character string in a direction in which characters are arranged within the row area is equal to or smaller than the length of the row area obtained before the enlargement or reduction in the same direction. Accordingly, since there is no need to insert a line feed etc. even though the row area including the enlarged character string becomes relatively long, it becomes possible to set the size of a blank image to become relatively large while utilizing a layout of the original script image as much as possible.

For example, the conversion ratio calculation circuit 308 calculates the enlargement ratio or reduction ratio such that a length (width) of the character string area including the enlarged character string in a direction in which the plurality of row areas are arranged is equal to or smaller than the length (width) of the character string area obtained before the enlargement or reduction in the same direction. More specifically, the conversion ratio calculation circuit 308 calculates the enlargement ratio or reduction ratio such that the enlarged character string or reduced character string is a maximum size within a range where a length (width) of the character string area including the enlarged character string in a direction in which the plurality of row areas are arranged is equal to or smaller than the length (width) of the character string area obtained before the enlargement or reduction in the same direction. Accordingly, since there is no need to insert a page break etc. even though the character string area including the enlarged character string becomes longer than the original script image, it is possible to set the size of each blank image to be relatively large while utilizing a layout of the original script image as much as possible.

The method of calculating an enlargement ratio and reduction ratio by the conversion ratio calculation circuit 308 will be described in more detail in examples to be described later.

The image conversion circuit 309 enlarges the marking superimposed on a character string, that has been obtained by the division by the row area division circuit 307 (Step S306), by the specific enlargement ratio or the enlargement ratio calculated by the conversion ratio calculation circuit 308 (Step S307), to create an enlarged character string (to be exact, image of enlarged character string). Then, the image conversion circuit 309 reduces the character string on which a marking is not superimposed, that has been obtained by the division by the row area division circuit 307 (Step S306), by the specific reduction ratio or the reduction ratio calculated by the conversion ratio calculation circuit 308 (Step S307), to create a reduced character string (to be exact, image of reduced character string) (Step S308). The image conversion circuit 309 lays out the created enlarged character strings and reduced character strings on a script to be output (Step S309). Examples of "laying out" include "center alignment" of aligning the plurality of row areas at the center, "left alignment" (in case of horizontal writing) of aligning the plurality of row areas on the left, and the like.

The blank creation circuit 305 creates a blank image to be superimposed on the enlarged character string created by the image conversion circuit 309 (Step S308) (Step S310). The blank image may be a simple blank or may include a specific style (underline, rectangular frame, parentheses, symbol, etc.).

The image synthesis circuit 306 lays out the image of the reduced character string, that has been created by the image conversion circuit 309 (Step S308), and the blank image created by the blank creation circuit 305 (Step S310) (Step S309) and creates a synthesis image (Step S311).

The image forming unit 16 forms (prints out) the synthesis image created by the image synthesis circuit 306 on a paper (Step S312).

(4. Examples)

In examples below, the method of calculating an enlargement ratio or reduction ratio by the conversion ratio calculation circuit 308 will be described in detail.

Figure 10:
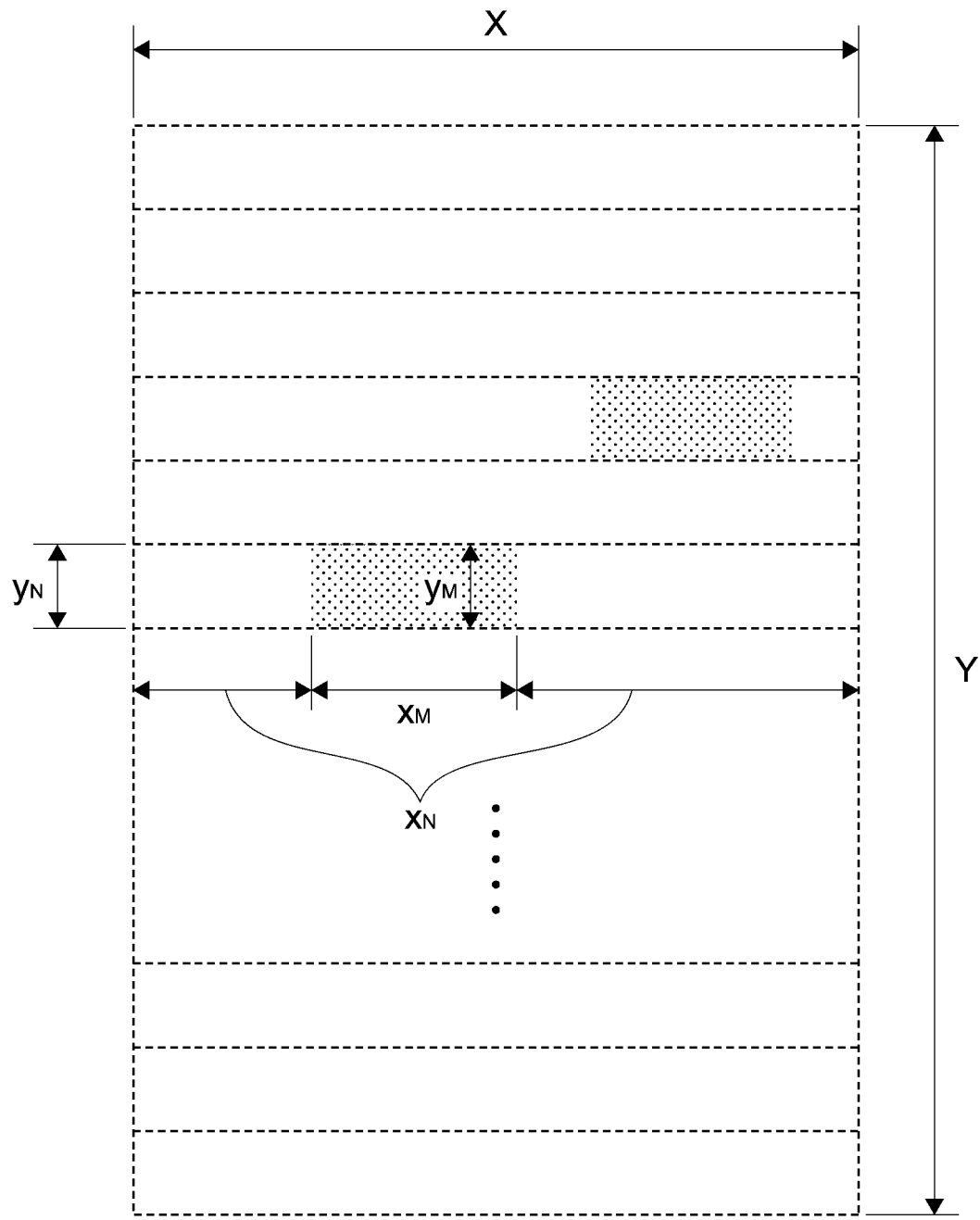
FIG. 10 illustrates variables used in a mathematical expression for calculating an enlargement ratio and a reduction ratio.

FIG. 10 illustrates variables used in mathematical expressions for calculating an enlargement ratio or a reduction ratio.

In the examples, it is assumed that characters are written horizontally. Hereinafter, a length of a row area in a direction in which characters are arranged (lateral direction of FIG. 10) is defined as "width". A length of a character string area in a direction in which the row areas are arranged (longitudinal direction of FIG. 10) is defined as "height". The variables used in the mathematical expressions for calculating an enlargement ratio or reduction ratio are defined below.

Values below are all values within a script image read by the image reading unit 12.

Total number of row areas included in one character string area: L

Total number of row areas including markings (hatched portions shown in FIG. 10), that are included in one character string area: $L_M$ Width of character string area: X Height of character string area: Y Total width of marking(s) superimposed on character string, that is/are included in one row area: $x_M$ Height of each marking superimposed on character string: $y_M$ Total width of character string(s) on which marking is not superimposed, that is/are included in row area including marking: $x_N$ Height of character string on which marking is not superimposed: $y_N$ Enlargement ratio for creating enlarged character string from marking superimposed on character string: $\alpha$ ($\alpha>1$)

Reduction ratio for creating reduced character string from character string on which marking is not superimposed $\beta$ ($0<\beta<1$)

All of the mathematical expressions shown in the examples below include an enlargement ratio $\alpha$ and reduction ratio $\beta$. One of the enlargement ratio $\alpha$ and the reduction ratio $\beta$ is defined as a variable. As a result, the other one of the enlargement ratio $\alpha$ and the reduction ratio $\beta$ can be calculated.

Sizes obtained after enlargement/reduction by the image conversion circuit 309 are defined as follows for convenience. These are not variables.

Width of row area including marking: X'

Height of character string area: Y'

(4-1. Example 1)

Figure 11:
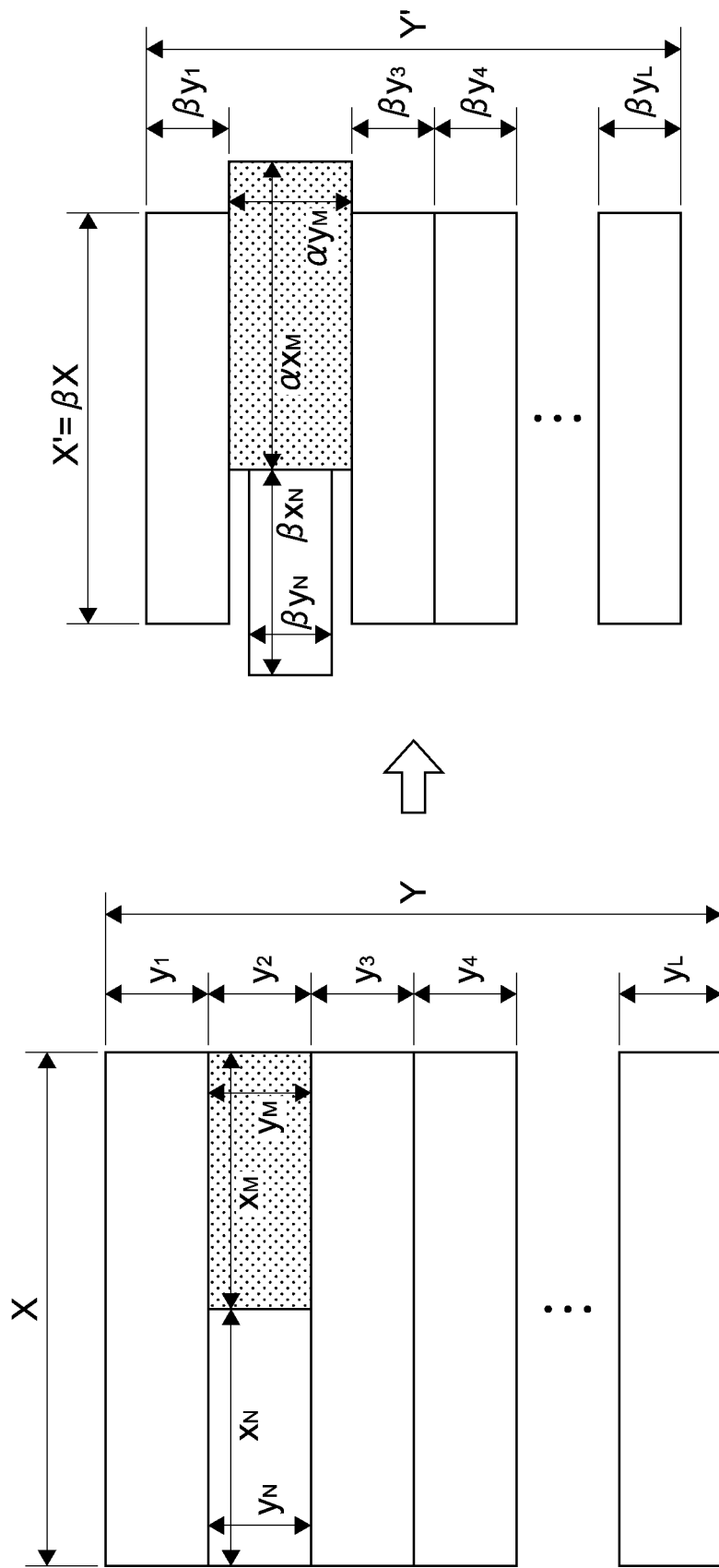
FIG. 11 illustrates a method of calculating an enlargement ratio or reduction ratio in Example 1.

FIG. 11 illustrates the method of calculating an enlargement ratio or reduction ratio in Example 1.

FIG. 11 shows a case where one of a plurality of row areas included in one character string area includes one marking (hatched portion shown in FIG. 11) and one character string on which a marking is not superimposed. In this case, Mathematical Expressions 1 and 2 only need to be established.

$$Y'=\alpha y_M+\beta(y_1+y_3+y_4+\ldots+y_L)\leq Y \quad \text{[Mathematical Expression 1]}$$

$\alpha y_M$ is a total height value of the row area including the marking, that is obtained after enlargement.

$\beta(y_1+y_3+y_4+\ldots+y_L)$ is a total value of heights of the plurality of row areas not including a marking, that is obtained after reduction.

$Y'\leq Y$ is established. Specifically, the height Y' of the character string area obtained after enlargement/reduction can be set to is equal to or smaller than the height Y of the character string area obtained before enlargement/reduction.

$$X'=\alpha x_M+\beta x_N\leq X \quad \text{[Mathematical Expression 2]}$$

$\alpha x_M$ is a total width value of the enlarged marking.

$\beta x_N$ is a total width value of a reduced character string on which a marking is not superimposed.

X'≤X is established. Specifically, the width X' of the row area including the enlarged/reduced marking can be set to is equal to or smaller than the width X of the character string area obtained before enlargement/reduction.

(4-2. Example 2)

Hereinafter, descriptions on points similar to those of the example above will be omitted, and different points will mainly be described.

Figure 12:
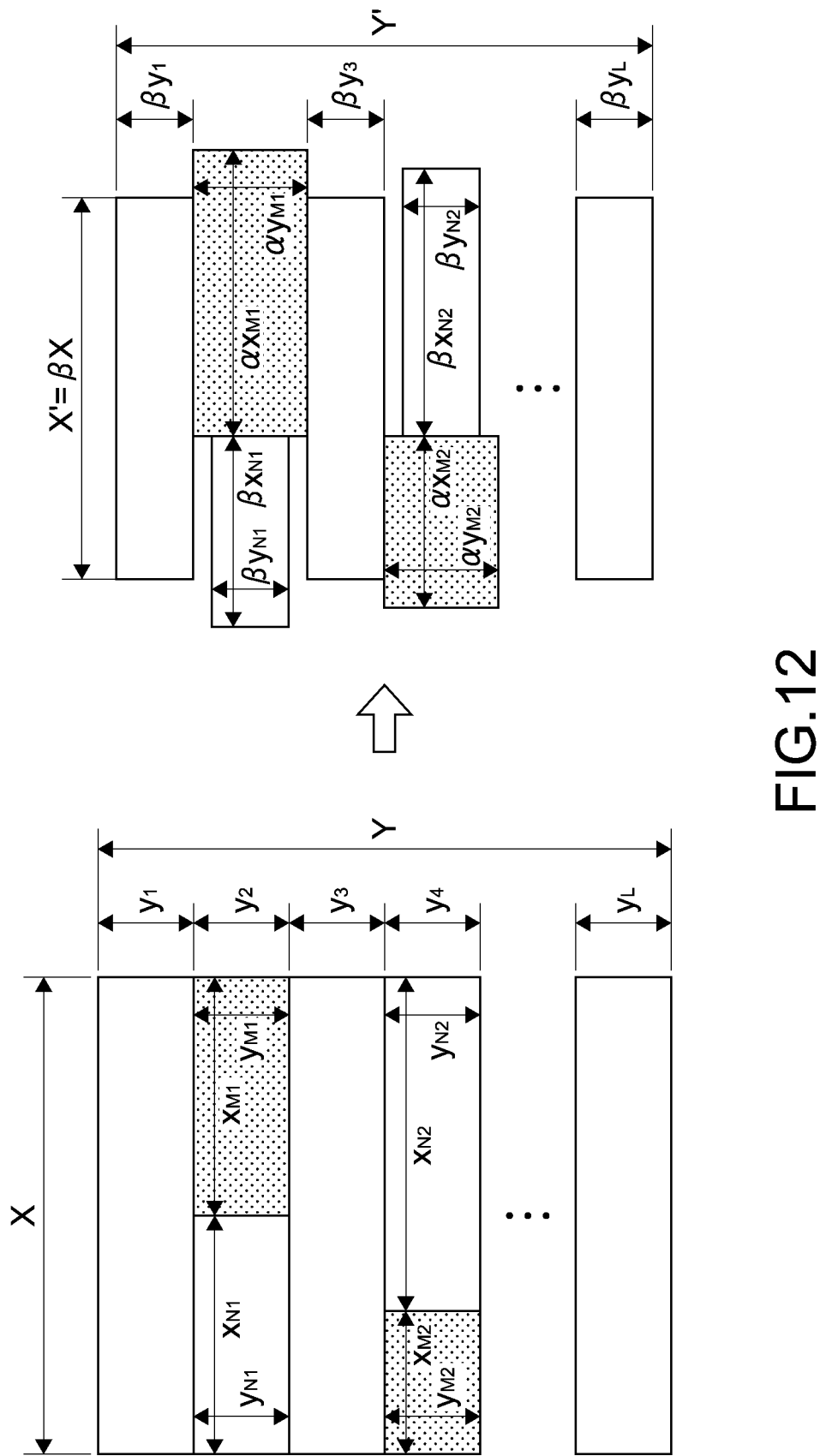
FIG. 12 illustrates a method of calculating an enlargement ratio or reduction ratio in Example 2.

FIG. 12 illustrates the method of calculating an enlargement ratio or reduction ratio in Example 2.

FIG. 12 shows a case where two of a plurality of row areas included in one character string area each include one marking (hatched portion shown in FIG. 12) and one character string on which a marking is not superimposed. In this case, Mathematical Expressions 3 to 5 only need to be established.

$$Y'=\alpha(y_{M1}+y_{M2})+\beta(y_1+y_3+\ldots+y_L)\leq Y \quad \text{[Mathematical Expression 3]}$$

$$X'_1=\alpha x_{M1}+\beta x_{N1}\leq X \quad \text{[Mathematical Expression 4]}$$

$$X'_2=\alpha x_{M2}+\beta x_{N2}\leq X \quad \text{[Mathematical Expression 5]}$$

(4-3. Example 3)

FIG. 13 illustrates the method of calculating an enlargement ratio or reduction ratio in Example 3.

FIG. 13 shows a case where one of a plurality of row areas included in one character string area includes one marking (hatched portion shown in FIG. 13) and two character strings on which a marking is not superimposed.

It is assumed that X=10, Y=12, L=6, $x_M$=2, $x_N$=5+3, $y_N$=2, $y_M$=2, and α=1.4 are preset as variables.

Mathematical Expressions 6 and 7 are obtained by substituting these variables in Mathematical Expressions 1 and 2.

$$Y'=1.4*2+\beta(2+2+2+2)\leq 12 \quad \text{[Mathematical Expression 6]}$$

According to Mathematical Expression 6, β≤0.92 is satisfied.

$$X'=1.4*2+\beta(5+3)\leq 10 \quad \text{[Mathematical Expression 7]}$$

According to Mathematical Expression 7, β≤0.9 is satisfied.

A minimum value of the reduction ratio β (i.e., value of reduction ratio β with which reduced character string has maximum size) within a range where both β≤0.92 and β≤0.9 are satisfied is 0.9. For enhancing visibility, a reduction ratio with which the reduced character string has a maximum size only needs to adopted. Therefore, in this case, it is favorable to set β=0.9.

(4-4. Example 4)

FIG. 14 illustrates the method of calculating an enlargement ratio or reduction ratio in Example 4.

FIG. 14 shows a case where two of a plurality of row areas included in one character string area each include markings (hatched portions shown in FIG. 14), and total widths $x_M$ of the markings of the two row areas are the same.

It is assumed that X=10, Y=12, L=6, $x_{M1}$ of a second row from the top=3+2, $x_{M2}$ of a fourth row from the top=4+1, $x_{N1}$ of the second row from the top=2+3, $x_{N2}$ of the fourth row from the top=1+4, $y_N$=2, $y_M$=2, and α=1.2 are preset as variables.

Mathematical Expressions 8 to 10 are obtained by substituting these variables in Mathematical Expressions 3 to 5.

$$Y'=1.2(2+2)+\beta(2+2+2+2)\leq 12 \quad \text{[Mathematical Expression 8]}$$

According to Mathematical Expression 8, β≤0.9 is satisfied.

$$X'_1=1.2*(3+2)+\beta(2+3)\leq 10 \quad \text{[Mathematical Expression 9]}$$

According to Mathematical Expression 9, β≤0.8 is satisfied.

$$X'_2=1.2*(4+1)+\beta(1+4)\leq 10 \quad \text{[Mathematical Expression 10]}$$

According to Mathematical Expression 10, β≤0.8 is satisfied.

A minimum value of the reduction ratio β (i.e., value of reduction ratio β with which reduced character string has maximum size) within a range where all of β≤0.9, β≤0.8, and β≤0.8 are satisfied is 0.8. For enhancing visibility, a reduction ratio with which the reduced character string has a maximum size only needs to be adopted. Therefore, in this case, it is favorable to set β=0.8.

(4-5. Example 5)

FIG. 15 illustrates the method of calculating an enlargement ratio or reduction ratio in Example 5.

FIG. 15 shows a case where two of a plurality of row areas included in one character string area each include a marking (hatched portions shown in FIG. 15), and total widths $x_M$ of the markings of the two row areas differ.

It is assumed that X=10, Y=12, L=6, $x_{M1}$ of the second row from the top=2, $x_{M2}$ of the fourth row from the top=5, $x_{N1}$ of the second row from the top=3+5, $x_{N2}$ of the fourth row from the top=2+3, $y_N$=2, $y_M$=2, and α=1.2 are preset as variables.

Mathematical Expressions 11 to 13 are obtained by substituting these variables in Mathematical Expressions 3 to 5.

$$Y'=1.2(2+2)+\beta(2+2+2+2)\leq 12 \quad \text{[Mathematical Expression 11]}$$

According to Mathematical Expression 11, β≤0.9 is satisfied.

$$X'_1=1.2*2+\beta(3+5)\leq 10 \quad \text{[Mathematical Expression 12]}$$

According to Mathematical Expression 12, β≤0.95 is satisfied.

$$X'_2=1.2*5+\beta(2+3)\leq 10 \quad \text{[Mathematical Expression 13]}$$

According to Mathematical Expression 13, β≤0.8 is satisfied.

A minimum value of the reduction ratio β (i.e., value of reduction ratio β with which reduced character string has maximum size) within a range where all of β≤0.9, β≤0.95, and β≤0.8 are satisfied is 0.8. For enhancing visibility, a reduction ratio with which the reduced character string has a maximum size only needs to be adopted. Therefore, in this case, it is favorable to set β=0.8.

Heretofore, Examples 1 to 5 have been described. It should be noted that, while including examples other than those described above, Mathematical Expressions 14 and 15 only need to be satisfied in the method of calculating an enlargement ratio or reduction ratio.

$$Y' = \alpha \sum_{n=1}^{n} y_{Mn} + \beta \sum_{m=1}^{m} y_{Lm} \leq Y \quad \text{[Mathematical Expression 14]}$$

In Mathematical Expression 14, n represents the number of row areas including markings, Mn represents a marking in the row areas including markings, m represents the number of row areas not including a marking, and Lm represents the row areas not including a marking.

$$X'_{Pn} = \alpha \sum_{s=1}^{s} x_{Ms} + \beta \sum_{t=1}^{t} y_{Nt} \leq X \quad \text{[Mathematical Expression 15]}$$

In Mathematical Expression 15, n represents the number of row areas including markings, Pn represents a row area including a marking, s represents the number of markings in the row area Pn, Ms represents the markings in the row area Pn, t represents the number of character strings on which a marking is not superimposed in the row area Pn, and Nt represents the character strings on which a marking is not superimposed in the row area Pn.

(5. Conclusion)

The MFP 1 creates fill-in-the-blank questions (blank questions) that require marked character strings as answers from a script image including markings superimposed on character strings. In the blanks, an answerer may write character strings or symbols as answers or a question creator may write symbols or the like. When the blanks are too small, it may be difficult for the answerer to write character strings and symbols, symbols written by the question creator may be difficult to be seen, and the like.

In contrast, according to this embodiment, the image conversion circuit 309 creates an enlarged character string by enlarging a character string on which a marking is superimposed and also creates a reduced character string by reducing a character string on which a marking is not superimposed. The blank creation circuit 305 creates a blank image to be superimposed on the enlarged character string. The image synthesis circuit 306 creates a synthesis image by synthesizing the reduced character string and the blank image.

By reducing the character strings (unmarked character strings) except for the blanks and enlarging the blanks, it becomes possible to relatively increase the size of the blanks while utilizing the layout of the original script image as much as possible.

IV. Fourth Embodiment (1. General Outline)

According to a fourth embodiment, a character string on which a marking is not superimposed, the character string being the same as that on which a marking is superimposed, is extracted from a script image, and a plurality of blank images to be respectively superimposed on the character string on which a marking is superimposed and the extracted character string are created.

(2. Functional Configuration of Image Forming Apparatus)

Figure 16:
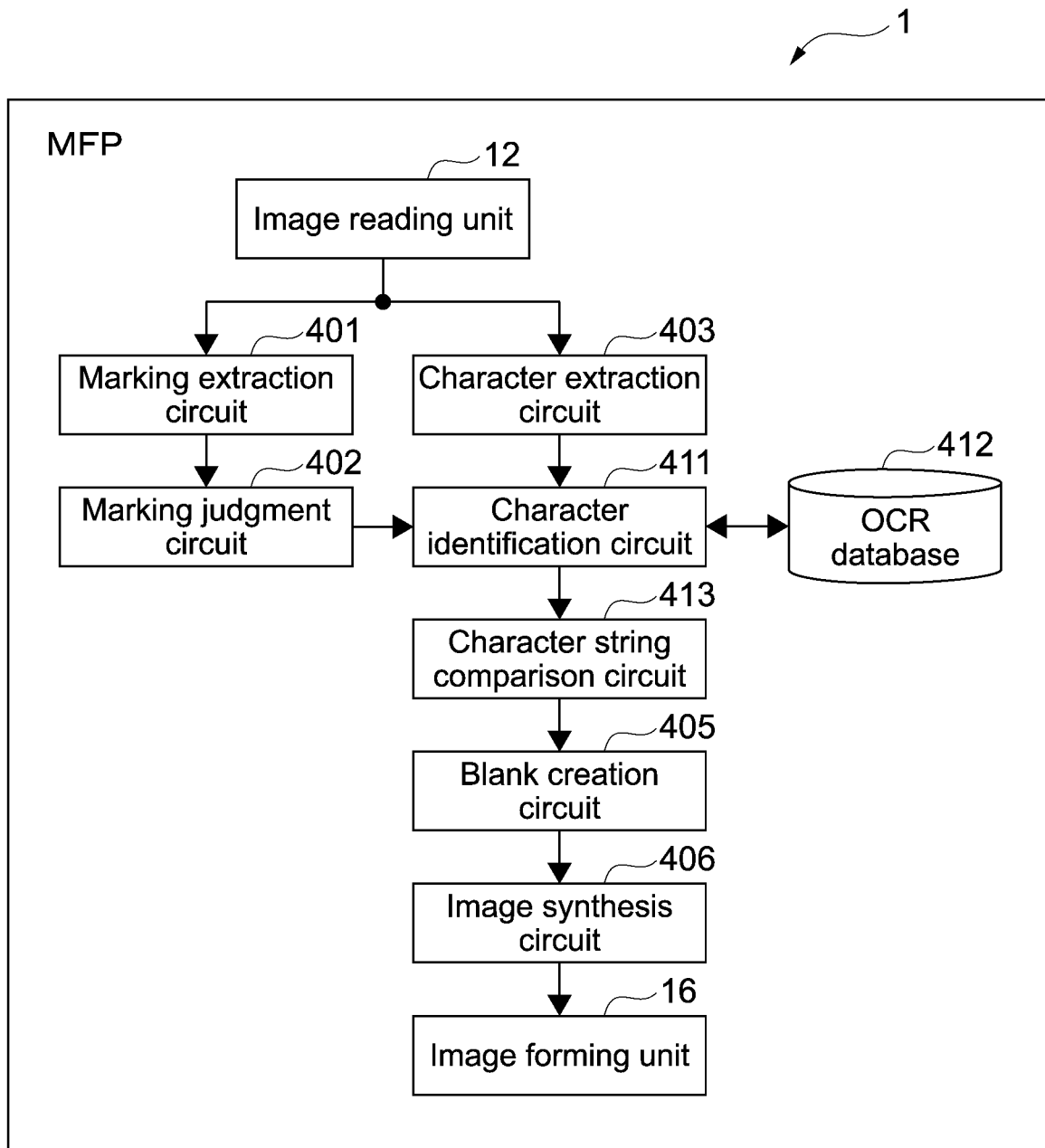
FIG. 16 shows a functional configuration of an image forming apparatus according to a fourth embodiment.

FIG. 16 shows a functional configuration of an image forming apparatus according to the fourth embodiment.

By loading an information processing program recorded in the ROM as an example of a non-transitory computer-readable recording medium in the RAM and executing it, the MFP 1 functions as a marking extraction circuit 401, a marking judgment circuit 402, a character extraction circuit 403, a character identification circuit 411, a character string comparison circuit 413, a blank creation circuit 405, and an image synthesis circuit 406.

The marking extraction circuit 401 extracts markings superimposed on character strings from a script image read by the image reading unit 12.

The marking judgment circuit 402 judges a position and shape of each of the markings extracted by the marking extraction circuit 401, within the script image.

The character extraction circuit 403 extracts a plurality of characters from the script image read by the image reading unit 12.

The character identification circuit 411 references an OCR database 412 and identifies each of the plurality of characters extracted by the character extraction circuit 403. The character identification circuit 411 identifies, based on the position and shape of each of the markings judged by the marking judgment circuit 402, the character strings on which the markings are superimposed using combinations of character codes.

The character string comparison circuit 413 extracts a character string on which a marking is not superimposed, the character string being the same as that identified by the character identification circuit 411 and on which a marking is superimposed, from the plurality of characters identified by the character identification circuit 411.

The blank creation circuit 405 creates blank images to be superimposed on the character string on which a marking is not superimposed, that has been extracted by the character string comparison circuit 413, and the character string on which a marking is superimposed.

The image synthesis circuit 406 creates a synthesis image by synthesizing the script image read by the image reading unit 12 and the blank images created by the blank creation circuit 405.

(3. Operations of Image Forming Apparatus)

Figure 17:
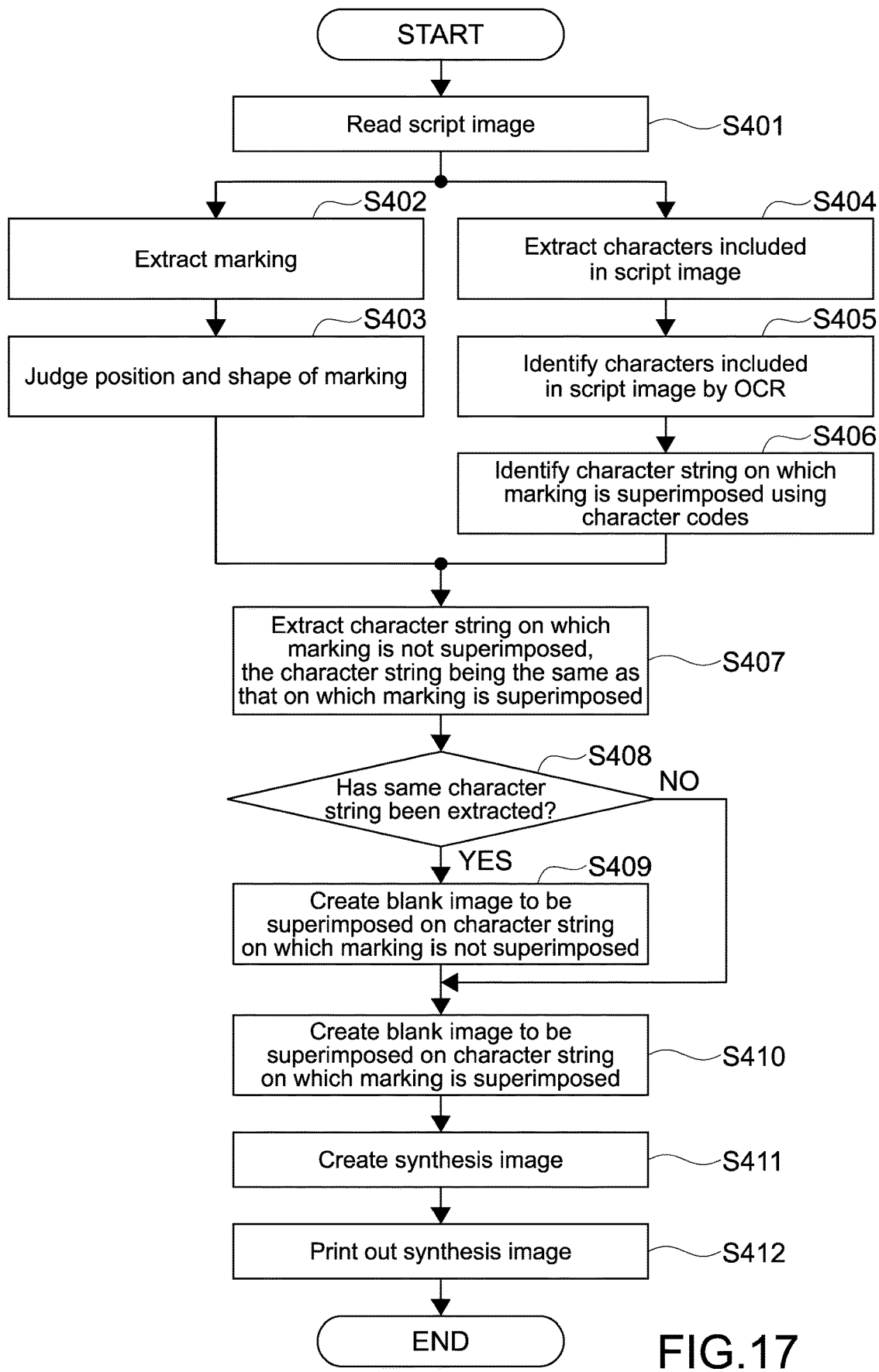
FIG. 17 shows an operational flow of the image forming apparatus.
Figure 18:
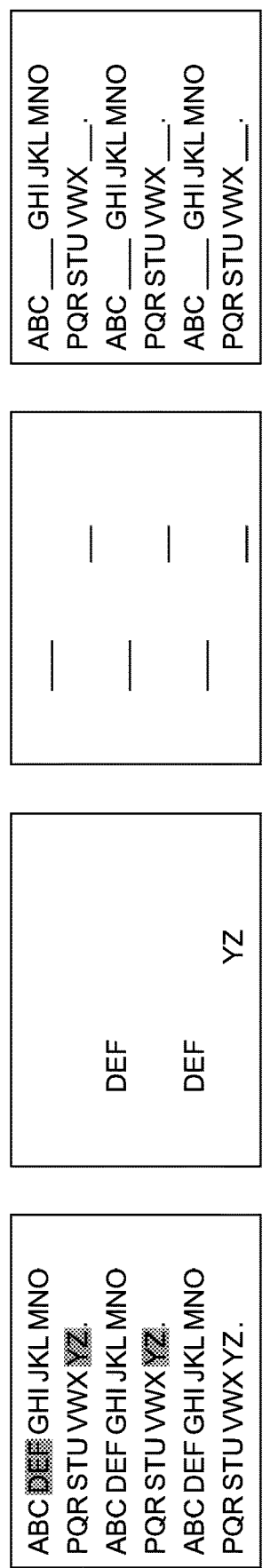
FIG. 18 illustrates operations of the image forming apparatus.

FIG. 17 shows an operational flow of the image forming apparatus. FIG. 18 illustrates operations of the image forming apparatus.

As a presupposition, character strings as text data are printed on a script (typically, paper). Alternatively, an image of character strings as image data is formed on a script (script on which character strings are printed is copied). In addition, a plurality of character strings (idiom, paragraph, numerical value, etc.) as a part of the entire character strings are marked in handwriting by the user as a question creator using a fluorescent marker or the like. The marked character strings are character strings that are to be answers for fill-in-the-blank questions.

The image reading unit 12 optically scans a script and reads a script image (Step S401, see FIG. 18). The "script image" is image data of a document script including a large number of character strings as a whole and includes a plurality of markings superimposed on a plurality of character strings (hatched portions in FIG. 18). The "character string" is a phrase (word, paragraph, sentence, etc.), a numerical value, or the like and is, to be exact, an image thereof.

The marking extraction circuit 401 extracts, from the script image read by the image reading unit 12, marking superimposed on character strings (Step S402). Specifically, the marking extraction circuit 401 extracts, as a marking, an area that has a specific shape and size (strip-like rectangle having specific width, etc.) and whose brightness and/or chroma differ(s) from those/that of the background (white etc.).

The marking judgment circuit 402 judges a position and shape of each of the markings extracted by the marking extraction circuit 401, within the script image (Step S403). Specifically, the marking judgment circuit 402 calculates the position and shape of each of the markings as coordinates with reference to the entire script image as a coordinate system.

Meanwhile, in parallel with Steps S402 and S403, the character extraction circuit 403 extracts a plurality of characters from the script image read by the image reading unit 12 (Step S404). Specifically, the character extraction circuit 403 extracts all the characters included in the script image by edge detection. In other words, the character extraction circuit 403 disassembles the script image into each character by the edge detection. That is, the "character" is a single character included in a script image (may be single word depending on language), and is, to be exact, an image thereof.

The character identification circuit 411 references the OCR database 412 and identifies each of the plurality of characters extracted by the character extraction circuit 403 (Step S405). Specifically, a character image pattern and a character code are associated with each other and registered for each character in the OCR database 412. The character identification circuit 411 searches the OCR database 412 for image patterns indicating the characters extracted by the character extraction circuit 403 and acquires character codes associated with the image patterns obtained by the search. The character identification circuit 411 acquires the character code for all the characters included in the script image.

Based on the position and shape of each of the markings judged by the marking judgment circuit 402, the character identification circuit 411 identifies the character string on which markings are superimposed. The character identification circuit 411 combines the character codes of all the characters included in the character strings on which markings are superimposed to identify the character strings on which markings are superimposed by the combined character codes (Step S406).

The character string comparison circuit 413 extracts a character string on which a marking is not superimposed, the character string being the same as that identified by the character identification circuit 411 and on which a marking is superimposed, from the plurality of characters identified by the character identification circuit 411 (Step S407, see FIG. 18). Specifically, the character string comparison circuit 413 compares a combination of character codes of a character string on which a marking is superimposed with character codes of a character string on which a marking is not superimposed. Then, the character string comparison circuit 413 extracts a combination of consecutive character codes out of all the characters on which a marking is not superimposed within the script image, the combination of character codes being the same as the combination of character codes of the character string on which a marking is superimposed. In the example shown in FIG. 18, character strings "DEF" and "YZ" are extracted.

As the character string comparison circuit 413 extracts the character string on which a marking is not superimposed, the character string being the same as that on which a marking is superimposed (YES in Step S408), the blank creation circuit 405 creates a blank image to be superimposed on each of the character string on which a marking is not superimposed, that has been extracted by the character string comparison circuit 413 (Step S409), and the character string on which a marking is superimposed (Step S410, see FIG. 18). On the other hand, when the character string comparison circuit 413 does not extract the character string on which a marking is not superimposed, the character string being the same as that on which a marking is superimposed (NO in Step S408), the blank creation circuit 405 creates a blank image to be superimposed on the character string on which a marking is superimposed (Step S410). Specifically, the blank creation circuit 405 creates a blank image in such a shape and position (coordinates) that the character extracted by the character extraction circuit 403 by edge detection (Step S404) and, when a marking is superimposed, an edge portion of the marking sticking out from this character are hidden. The blank image may be a simple blank or may include a specific style (underline, rectangular frame, parentheses, etc.). In the example shown in FIG. 18, the blank image includes an underline.

The image synthesis circuit 406 creates a synthesis image by synthesizing the script image read by the image reading unit 12 (Step S401) and the blank images created by the blank creation circuit 405 (Steps S409 and S410) (Step S411, see FIG. 18). Specifically, the image synthesis circuit 406 arranges the blank images whose shapes and positions are defined by coordinates in the coordinate system of the script image. In the example shown in FIG. 18, the script image and the blank images each including an underline are synthesized.

The image forming unit 16 forms (prints out) the synthesis image created by the image synthesis circuit 406 on a paper (Step S412).

(4. Modified Example)

In the embodiments, the blank image is a simple blank or the like. However, a symbol (number, character, mark, etc.) may be allocated to the blank image.

Specifically, in one modified example, the character string comparison circuit 413 allocates the same symbol (number, character, mark, etc.) to a character string on which a marking is superimposed and the same character string on which a marking is not superimposed.

The image synthesis circuit 406 creates a synthesis image by synthesizing the script image read by the image reading unit 12, the blank images created by the blank creation circuit 405, and a symbol image as an image of symbols allocated by the character string comparison circuit 413. Specifically, the image synthesis circuit 406 creates a synthesis image by arranging symbols of a specific style (font, size, etc.) at specific positions (center, left end, etc.) of the blank images arranged in the script image.

In the embodiments, the image reading unit 12 reads a script image (Step S401). Alternatively, the MFP 1 may receive a script image from an information processing apparatus (not shown) connected to a network via the network communication unit 13.

(5. Conclusion)

When creating fill-in-the-blank questions using an original script, the same character string to be an answer may appear several times in a set of sentences. In this case, because the character strings as an answer may serve as a hint when displayed as they are in the set of sentences, all the same character strings as an answer need to be replaced with blanks. However, the question creator manually extracting all the same character strings as an answer requires time and effort, and it is difficult to reliably extract all the same character strings.

In contrast, according to this embodiment, the MFP 1 extracts a character string on which a marking is not superimposed, the character string being the same as that on which a marking is superimposed, from a script image (Step S407) and creates a plurality of blank images to be respectively superimposed on the character string on which a marking is superimposed and the extracted character string (Steps S409 and S410). Accordingly, all the same character strings as an answer can reliably be replaced with blanks. Therefore, a situation where the character strings as an answer serve as a hint when displayed as they are in a sentence is prevented from occurring, and time and effort of the question creator manually extracting all the same character strings as an answer is omitted.

Further, when different symbols are allocated to a plurality of blank images for the same character string as an answer, there is a fear that the answerer may misunderstand that different words are required as answers in those blanks. The question creator manually allocating the same symbol to the plurality of blank images for the same character string as an answer for preventing such a situation from occurring requires time and effort. Particularly when there are a large number of blanks in total, when there are a plurality of sets of the same character string, and the like, the manual allocation of symbols by the question creator will lead to allocation of different symbols by mistake.

In contrast, according to the modified example, the MFP 1 allocates the same symbol to the character string on which a marking is superimposed and the same character string on which a marking is not superimposed. Accordingly, a situation where the answerer misunderstands that different words are required as answers due to different symbols being allocated to the plurality of blanks for the same character string as an answer is prevented from occurring. Moreover, time and effort required for the question creator to manually allocate the same symbol to the plurality of blanks for the same character string as an answer is eliminated, and different symbols will not be allocated by mistake.

It should be noted that the embodiments above describe the processing carried out in a case where a character string including a plurality of characters is marked. However, also when a single character is marked as a character string, the processing can be carried out according to FIG. 17. In this case, in Step S406 of FIG. 17, the character identification circuit 411 does not need to combine character codes of all the characters included in a character string and only needs to identify the character by the character code of the single character on which a marking is superimposed. In addition, in Step S407 of FIG. 17, the character identification circuit 411 only needs to compare the character code of one character on which a marking is superimposed with the character code of a character on which a marking is not superimposed and extract all characters on which a marking is not superimposed within the script image, that are the same as the character code of the single character on which a marking is superimposed.

Further, when one character (one word depending on language) is marked, execution of the processing shown in FIG. 17 may be avoided. In general, the same one character is sometimes used differently within a script. In such a case, the one character unintended by the user can be prevented from being replaced with a blank.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
    a marking extraction circuit that extracts, from a script image including a character string area including a character string on which a marking is superimposed and a character string on which a marking is not superimposed, the marking;
    an image conversion circuit that creates an enlarged character string by enlarging the character string on which the marking is superimposed and creates a reduced character string by reducing the character string on which a marking is not superimposed;
    a marking judgment circuit that judges a position and shape of the marking extracted by the marking extraction circuit, within the script image;
    a character string area judgment circuit that judges a position and size of the character string area within the script image;
    a row area judgment circuit that divides the character string area into one or more row areas and judges a position and size of each of the one or more row areas within the character string area; and
    a row area division circuit that
    judges, based on a position and size of the marking within the script image and a position and size of each of the one or more row areas within the character string area, a position and size of the marking within the row area to which the marking belongs, and
    divides the row area to which the marking belongs into the character string on which the marking is superimposed and the character string on which a marking is not superimposed,
    wherein the image conversion circuit creates the enlarged character string and the reduced character string by enlarging and reducing the character strings obtained by the division by the row area division circuit.

2. The information processing apparatus according to claim 1, further comprising:
    a blank creation circuit that creates a blank image to be superimposed on the enlarged character string; and
    an image synthesis circuit that creates a synthesis image by synthesizing the reduced character string and the blank image.

3. The information processing apparatus according to claim 1, further comprising
    a conversion ratio calculation circuit that
    calculates an enlargement ratio for creating the enlarged character string from the marking superimposed on the character string, or
    calculates a reduction ratio for creating the reduced character string from the character string on which a marking is not superimposed.

4. The information processing apparatus according to claim 3, wherein
    within a range where a length of the row area including the enlarged character string in a direction in which characters are arranged within the row area is equal to or smaller than that of the row area before enlargement and reduction,
    the conversion ratio calculation circuit calculates
    the enlargement ratio based on a specific reduction ratio such that the enlarged character string has a maximum size, or
    the reduction ratio based on a specific enlargement ratio such that the reduced character string has a maximum size.

5. The information processing apparatus according to claim 3, wherein
    within a range where a length of the character string area including the enlarged character string in a direction in which the one or more row areas are arranged is equal to or smaller than that of the character string area before enlargement and reduction,
    the conversion ratio calculation circuit calculates
    the enlargement ratio based on a specific reduction ratio such that the enlarged character string has a maximum size, or the reduction ratio based on a specific enlargement ratio such that the reduced character string has a maximum size.

6. An information processing apparatus, comprising:

a marking extraction circuit that extracts, from a script image including a character string area including a character string on which a marking is superimposed and a character string on which a marking is not superimposed, the marking;

an image conversion circuit that creates an enlarged character string by enlarging the character string on which the marking is superimposed and creates a reduced character string by reducing the character string on which a marking is not superimposed;

a blank creation circuit that creates a plurality of blank images to be respectively superimposed on the plurality of character strings on which the markings are respectively superimposed, each of the plurality of blank images having a shape and a position with which the character string on which the marking is superimposed and edge portions of the marking sticking out from the character string are hidden by each of the plurality of blank images; and an image synthesis circuit that creates a synthesis image by synthesizing the script image, the plurality of blank images, and a symbol image as an image of the allocated symbols.

* * * * *